United States Patent
Bivens et al.

(10) Patent No.: US 6,810,978 B2
(45) Date of Patent: Nov. 2, 2004

(54) ASSEMBLY WITH LOCATING-POINT INSERTS INTEGRALLY MOLDED OR CAST INTO LOCATING STRUCTURES

(75) Inventors: Charles M. Bivens, Fort Wayne, IN (US); Jerry L. Steiner, Decatur, IN (US); Peter J. Voors, Fort Wayne, IN (US); Charles W. Kipfer, Payne, OH (US); James Hubbard, Alexandria, OH (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/191,105

(22) Filed: Jul. 9, 2002

(65) Prior Publication Data

US 2004/0007407 A1 Jan. 15, 2004

(51) Int. Cl.⁷ ............................................. B62D 25/12
(52) U.S. Cl. ................. 180/69.2; 180/89.1; 296/193.11
(58) Field of Search .......................... 180/69.2, 69.21, 180/69.22, 69.23, 89.1; 296/193.11, 901.01, 202, 146.11; 403/52, 81, 83, 85, 296, 321, 322.1, 116

(56) References Cited

U.S. PATENT DOCUMENTS

| | | | |
|---|---|---|---|
| 3,321,236 A | * 5/1967 | Sewelin | 296/35.1 |
| 3,927,730 A | * 12/1975 | Winslow | 180/271 |
| 3,985,385 A | * 10/1976 | Kennicutt et al. | 296/35.1 |
| 3,990,737 A | * 11/1976 | Palmer | 296/35.1 |
| 4,043,585 A | * 8/1977 | Yamanaka | 296/35.1 |
| 4,210,362 A | * 7/1980 | Boersma | 296/190.07 |
| 4,764,409 A | 8/1988 | Freeman | |
| 5,273,341 A | * 12/1993 | Cornille, Jr. | 296/193.12 |
| 5,513,891 A | * 5/1996 | Horiuchi | 296/37.1 |
| 5,672,405 A | 9/1997 | Plank, Jr. et al. | |
| 5,864,634 A | 1/1999 | Kurita | |
| 6,030,022 A | * 2/2000 | Bormann et al. | 296/107.04 |
| 6,030,029 A | * 2/2000 | Tsuda et al. | 296/203.02 |
| 6,314,633 B1 | 11/2001 | Norkus et al. | |
| 6,327,827 B1 | * 12/2001 | Flegel et al. | 52/309.13 |
| 6,374,936 B1 | * 4/2002 | Smith | 180/89.17 |
| 6,640,918 B2 | * 11/2003 | Sorvari | 180/69.22 |

OTHER PUBLICATIONS

Tri–Star, Inc., Threaded Inserts catalogue, published Feb. 1998.

* cited by examiner

*Primary Examiner*—Christopher P. Ellis
*Assistant Examiner*—Bridget Avery
(74) *Attorney, Agent, or Firm*—Jeffrey P. Calfa; Dennis Kelly Sullivan; Susan L. Lukasik

(57) ABSTRACT

An assembly comprises a mounted component that is located relative to a mounting component through one or more compilmentary locating-structure pairs that comprise locating structures of the mounted component and of the mounting component that are engaged to one another. The locating structures of the mounted component and the mounting component are those portions thereof that are engaged to one another and through which the forces of gravity and other acceleration forces are transmitted between the mounted component and the mounting component. One or more of the locating structures of the complimentary locating-structure pairs includes a locating-point insert that is integrally molded or cast into parent material of the locating structure. The locating-point inserts are harder, more wear-resistant, stiffer, and/or stronger than the parent material that they are integrally molded or cast into. The locating-point inserts function to increase the durability of the mounting and mounted components' locating structures.

52 Claims, 25 Drawing Sheets

ASSEMBLY WITH LOCATING-POINT INSERTS INTEGRALLY MOLDED OR CAST INTO LOCATING STRUCTURES

BACKGROUND OF THE INVENTION

The present invention relates to components that include inserts of one material integrally molded or cast into parent material of another material.

DRAWINGS

Other objects and advantages of the invention will become more apparent upon perusal of the detailed description thereof and upon inspection of the drawings in which.

Figure 22:
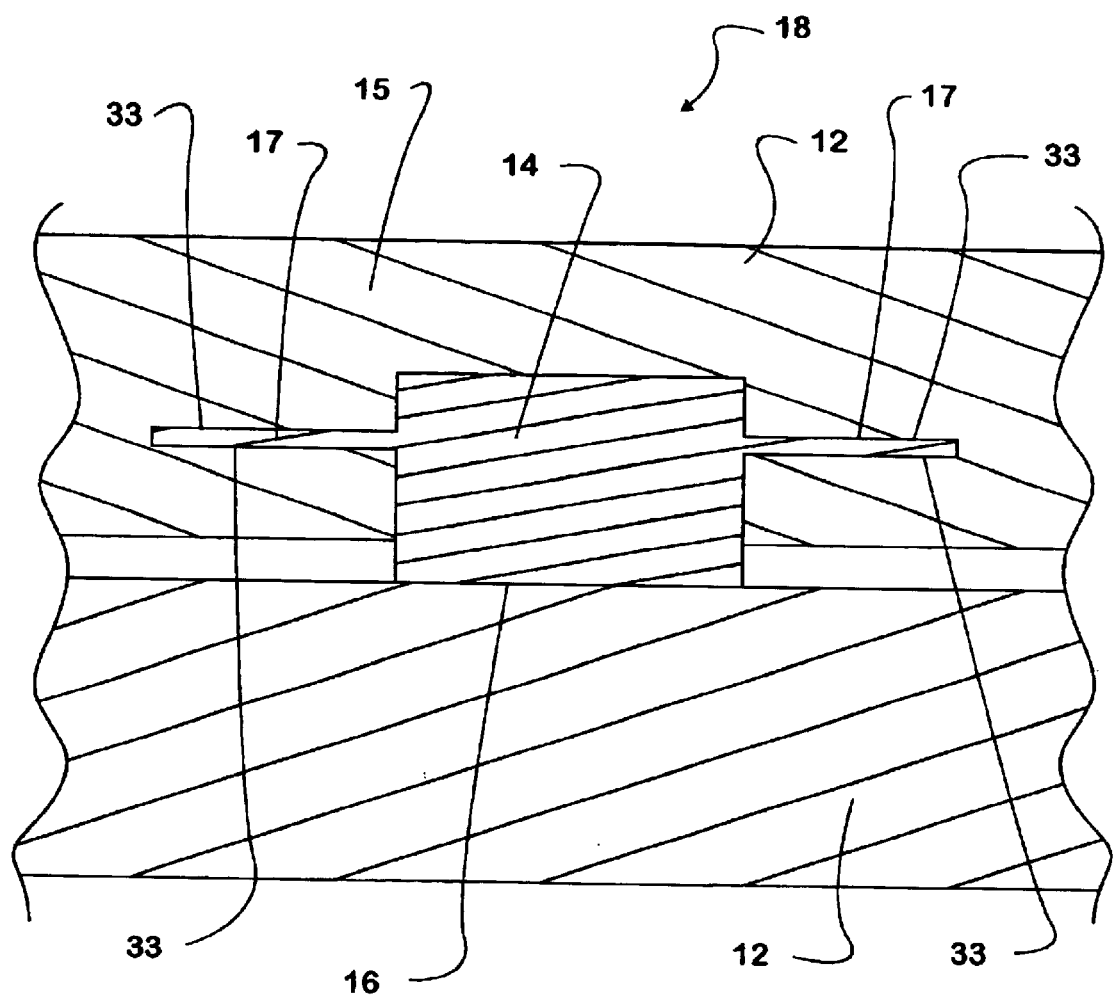

FIG. 22 illustrates, in section, one embodiment of a complimentary locating-structure pair according to the present invention in which one of the locating-structures thereof comprises a locating-point insert that is integrally molded or cast into parent material thereof and a portion of which locating point insert juts out abruptly from the parent material thereof at points in the outer surface of the locating structure at which the parent material and the locating-point insert meet.

Figure 23:
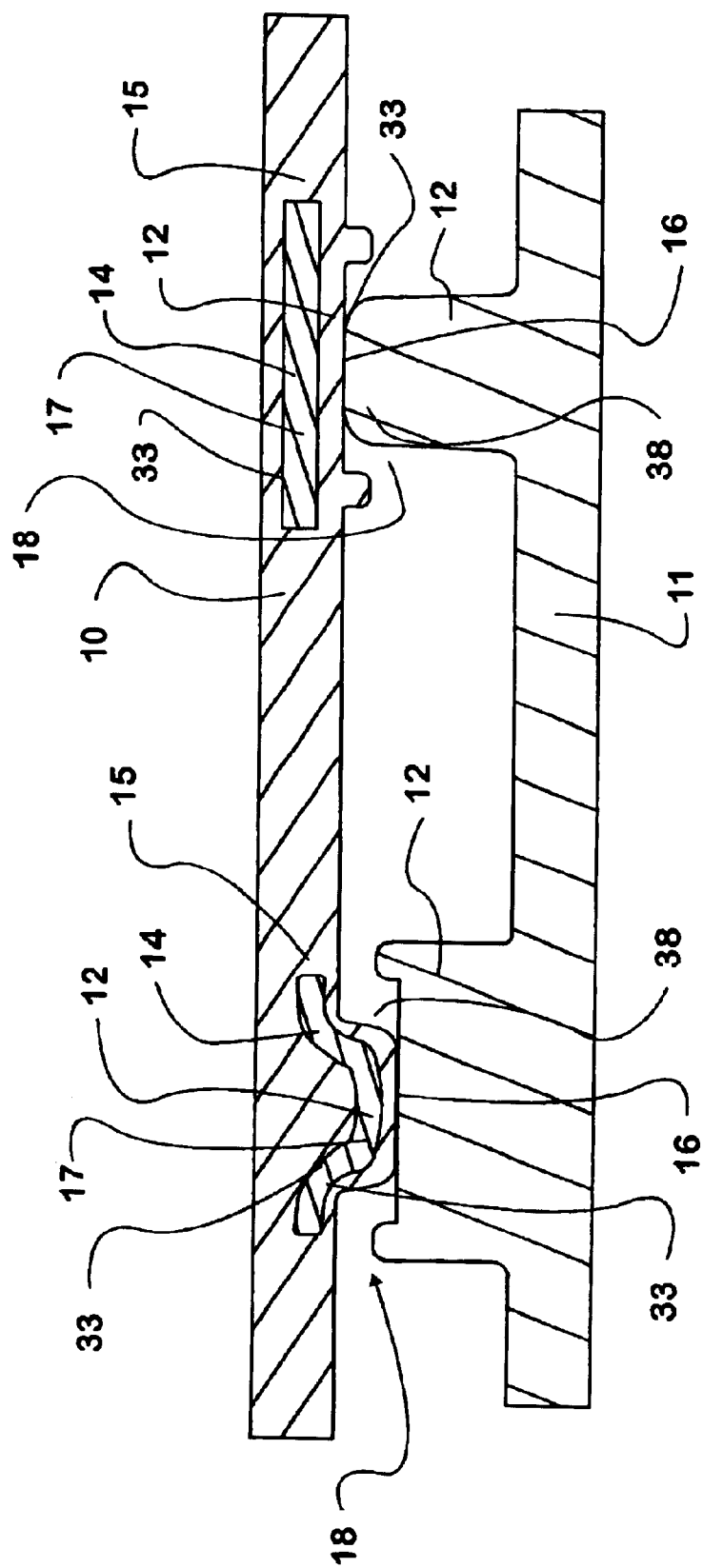

FIG. 23 illustrates, in section, one embodiment of the present invention in which the construction and engagement to one another of the mounted component and the mounting component will definitely allow sliding against one another of the outer abutment-surfaces of complimentary locating-structure pairs that have locating structures of cooperating male and female constructions.

Figure 8:
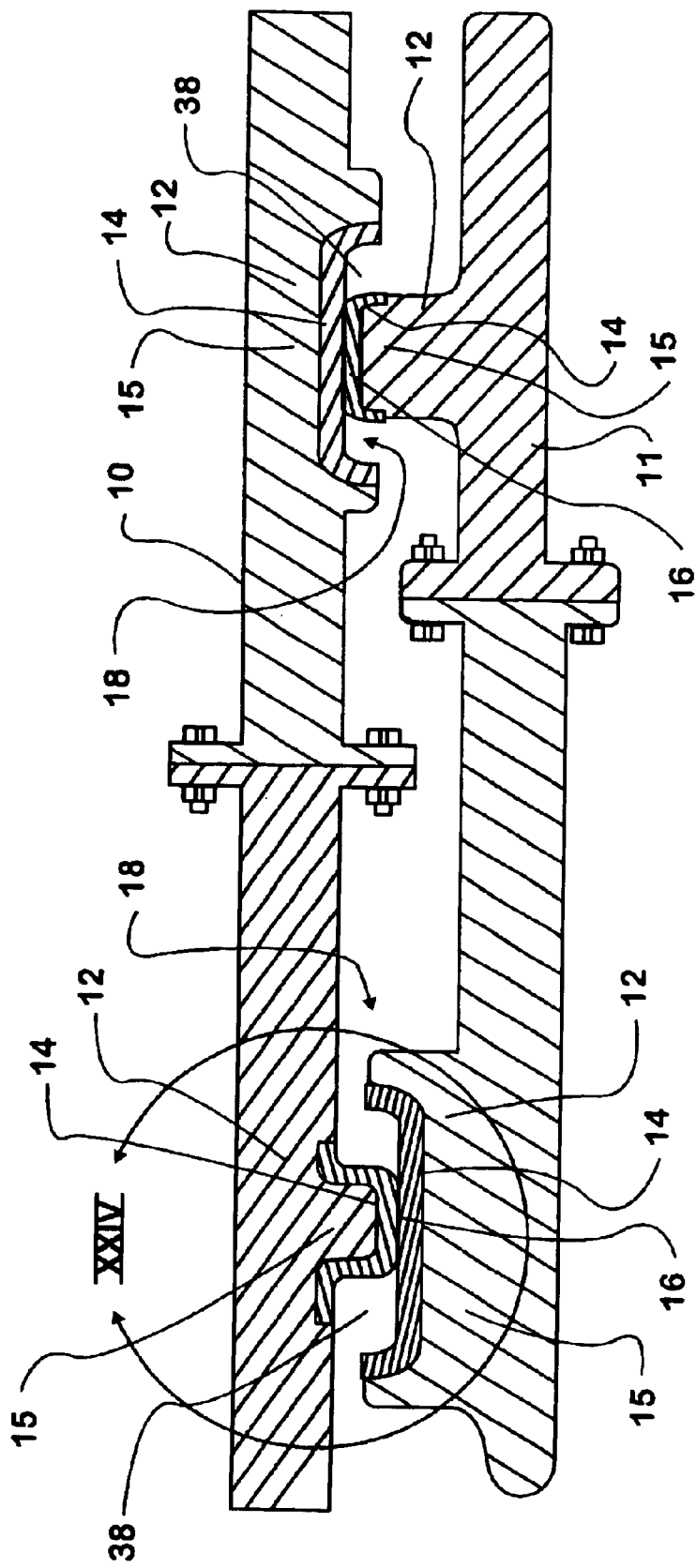
FIG. 8 shows, in section, one embodiment of an assembly in accordance with the present invention in which the mounted component is constructed of multiple different components engaged to one another and the mounting component is also constructed of multiple different components engaged to one another.
Figure 24:
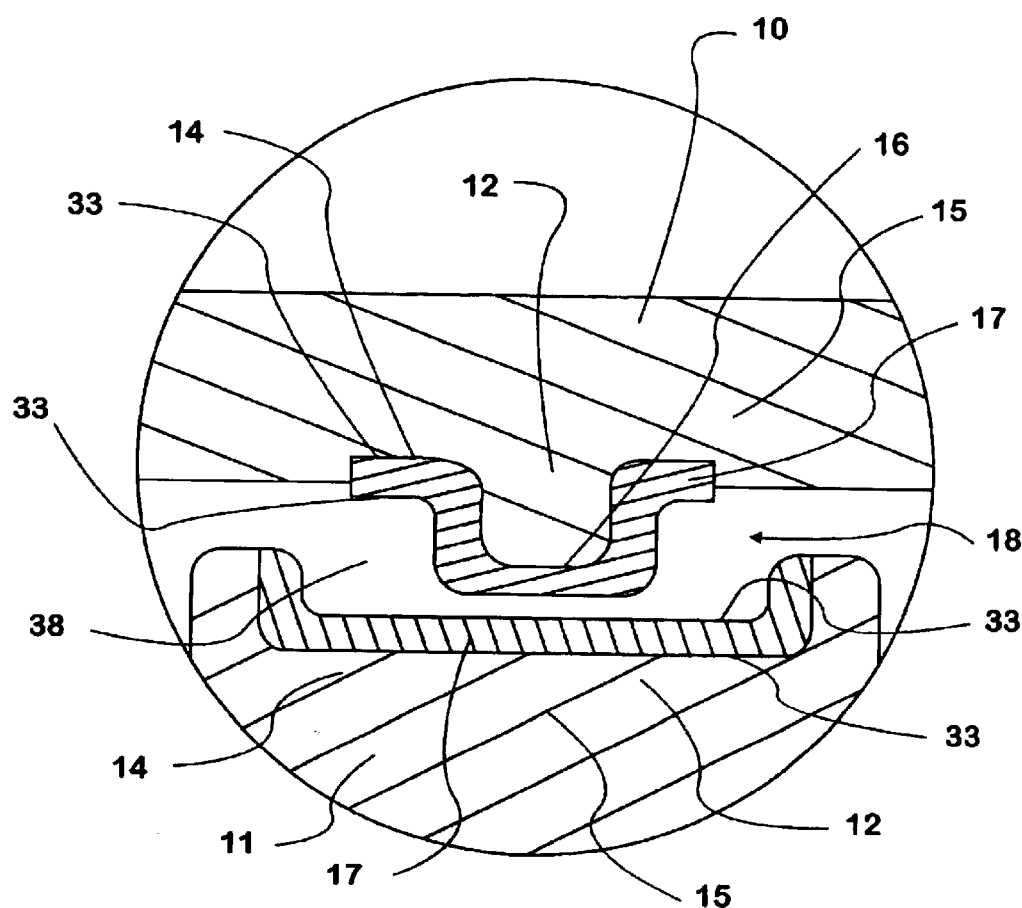

FIG. 24 is a close up view of the portion of FIG. 8 that is circumscribed by circle XXIV.

Figure 25:
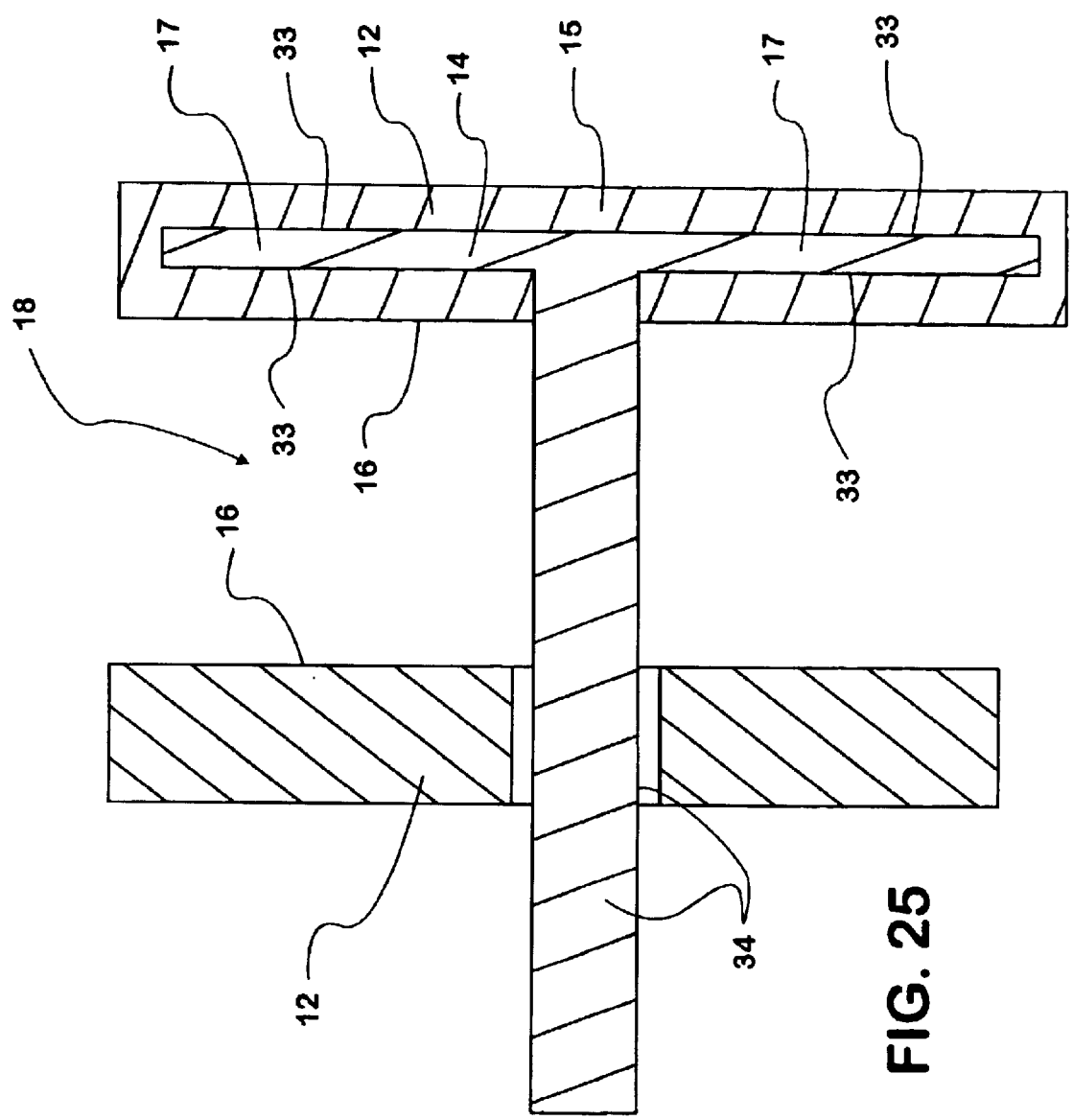

FIG. 25 illustrates, in section, one embodiment of a complimentary locating-structure pair according to the present invention in which a locating-point insert that is integrally molded or cast into parent material of one of the locating structures thereof has sheet-body portions major faces of which face in directions in which relative movement is allowed by the engagement of the locating structures thereof to one another.

DETAILS OF INVENTION

The present invention includes assemblies of a mounted component 10 that is mounted to a mounting component 11 and that is located relative to the mounting component 11 by one or more complimentary locating-structure pairs 18 each of which includes a locating structure 12 of the mounted component 10 and a locating structure 12 of the mounting component 11. One or more of the locating structures 12 of the mounted component 10 and/or one or more of the locating structures 12 of the mounting component 11 of such assemblies according to the present invention comprise one or more locating-point inserts 14 integrally molded or cast into parent material 15 thereof. The present invention further includes mounting components 11 and mounted components 10 that are adapted for use in such assemblies by virtue of having locating-point inserts 14 integrally molded or cast into parent material of locating structures 12 thereof. The locating-point inserts 14 of the present invention are constructed of a different material than the parent material 15 into which they are integrally molded or cast. Each of the locating-point inserts 14 of a mounted component 10, a mounting component 11, and/or an assembly thereof is constructed of one or more materials at least one of which is harder, more wear-resistant, stiffer, and/or stronger than the parent material 15 into which it is integrally molded or cast. The locating-point inserts 14 of the present invention function to provide for excellent durability of the complimentary locating-structure pairs 18 that comprise them in one or more of a number of different ways. In some embodiments of the present invention one or more locating-point inserts 14 reinforce the locating structure 12 within the parent material 15 of which they are integrally molded or cast. In some embodiments of the present invention one or more of the locating-point inserts 14 transfer forces between the locating structures 12 of the complimentary locating-structure pairs 18 that comprise them in a distributed manner. In some embodiments of the present invention one or more of the locating-point inserts 14 function as a wear-resistant interface between the locating structures 12 of the complimentary locating-structure pairs 18 that comprise them.

Figure 9:
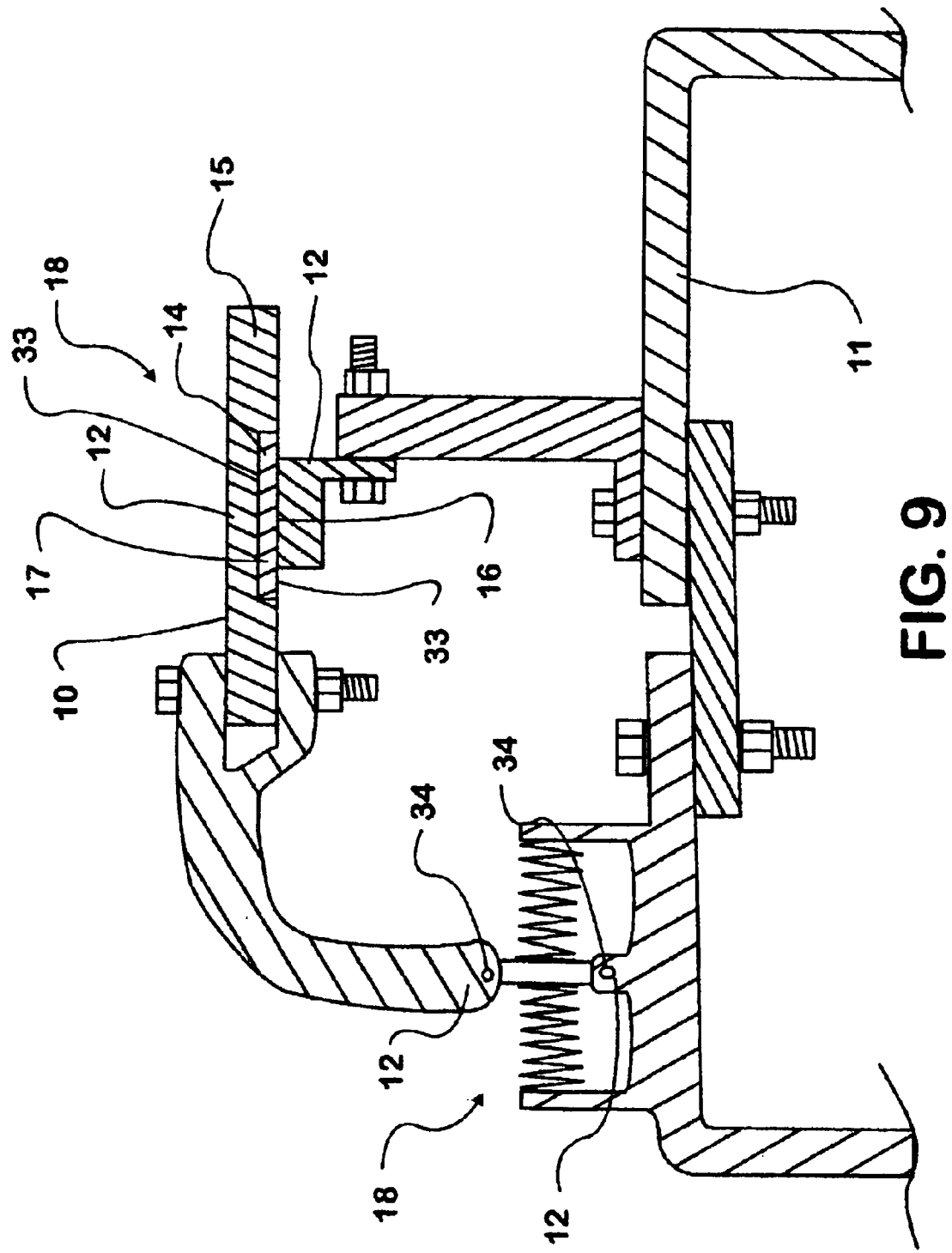
FIG. 9 shows, in section, one embodiment of an assembly in accordance with the present invention that is constructed in such a manner that an outer abutment-surface of one of the locating structures thereof will definitely be allowed to slide against an outer abutment-surface of the locating structure of the mounting component to which it is engaged.
Figure 12:
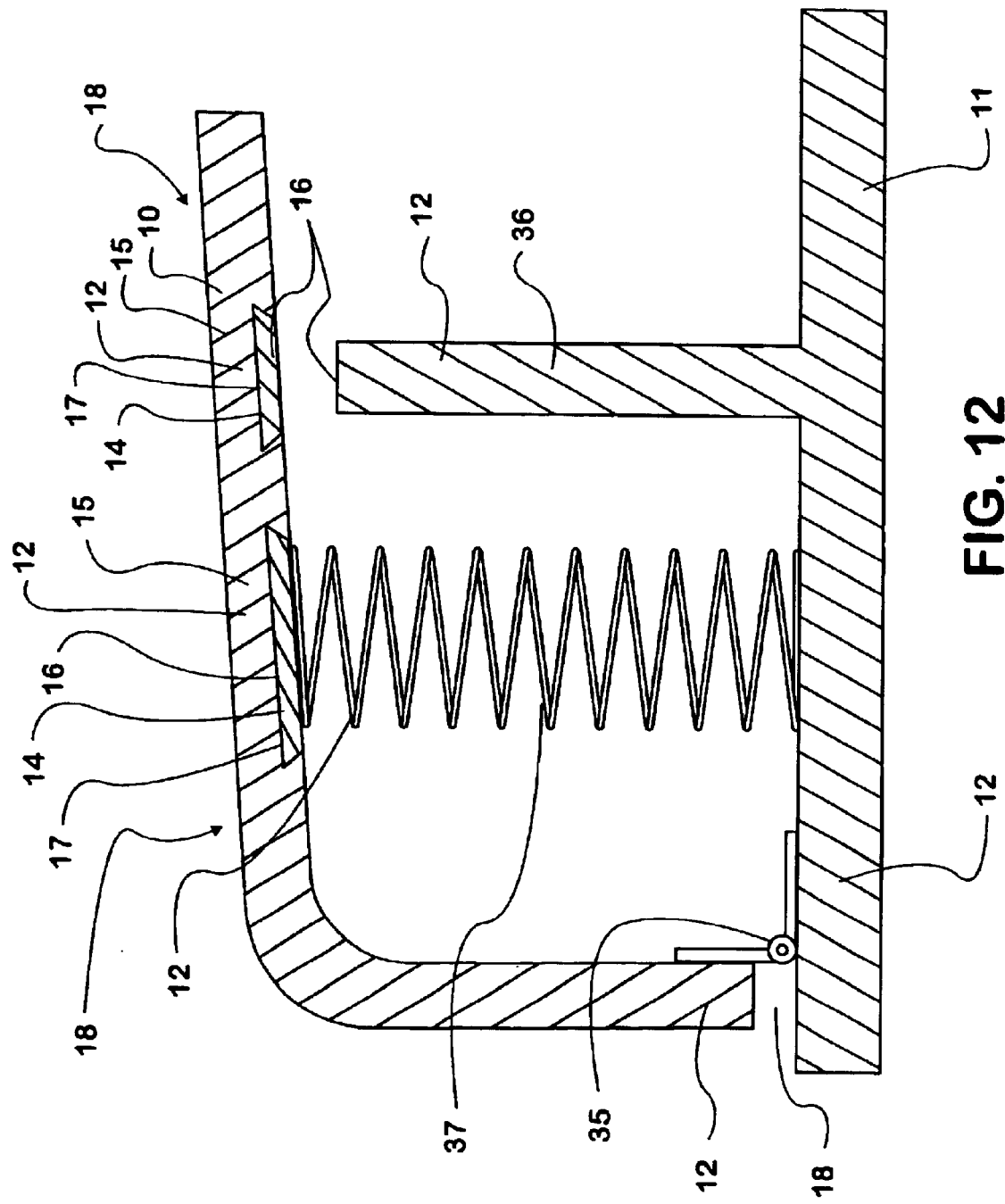
FIG. 12 shows, in section, one embodiment of an assembly according to the present invention in which the construction and engagement to one another of one or more of the locating structures of the complimentary locating-structure pairs thereof is such that they constrict relative movement between themselves only in certain directions and/or only in certain circumstances.

Mounted components 10, mounting components 11, and assemblies thereof in accordance with the present invention may have any of number of different constructions in which the locating structures 12 of the mounted component 10 and the mounting component 11 are engageable or engaged to one another in such a manner to effect support of the mounted component 10 by the mounting component 11 and location of the mounted component 10 relative to the mounting component 11. The locating structures 12 of a mounted component 10 according to the present invention are those portions of the mounted component 10 that are engaged to the locating structures 12 of the mounting component 11 when the mounted component 10 is mounted thereto and are also those portions of the mounted component 10 through which the weight of the mounted component 10 and any other forces that function to locate the mounted component 10 relative to the mounting component 11 are transferred to the mounting component 11. The locating structures 12 of the mounting component 11 are those portions of the mounting component 11 that are engaged to the locating structures 12 of the mounted component 10 when the mounted component 10 is mounted to the mounting component 11 and through which the locating forces that locate the mounted component 10 relative to the mounting component 11 are transferred to the mounting component 11. A mounted component 10 and its locating structures 12 according to the present invention may be constructed of a single unitary piece, one example of which is illustrated in FIG. 12 or they may be constructed of multiple different components that are engaged to one another and that, in aggregate, constitute the mounted component 10 and the locating structures 12 thereof, examples of which are illustrated in FIGS. 8 and 9. Likewise, a mounting component 11 and its locating structures 12 according to the present invention may be constructed of a single unitary piece, an example of which is illustrated in FIG. 12, or they may be constructed of multiple different components that are engaged to one another and that, in aggregate, constitute the mounting component 11 and the locating structures 12 thereof, examples of which are illustrated in FIGS. 8 and 9.

The locating structures 12 of each complimentary locating-structure pair 18 according to the present invention may be constructed and engaged to one another in any of a number of ways that effect constriction of relative movement of the locating structures 12 themselves and, thus, the mounted component 10 and the mounting component 11 in at least one direction. Friction between the locating structures 12 of a complimentary locating-structure pair 18 may function to constrict relative movement therebetween. As can be seen in FIGS. 1, 4, 5, 6, 7, 8, 9, 12, and 14 abutment between the locating structures 12 may constrict relative movement therebetween. As can be seen 5, 10, 11, 18, 19, and 20, the locating structures 12 of a complimentary locating-structure pair 18 may define one or more interlocking features such as male and female threads, pins and bores, pins and slots, hooks and latches, teeth and grooves etc., that function to constrict relative movement of the locating structures 12 that define them. The construction and engagement to one another of the locating structures 12 of a complimentary locating-structure pair 18 may be of any of a number of different designs that utilize some combination of friction, abutment, and/or engagement of interlocking features to constrict relative movement between the locating structures 12.

In addition to being directly engaged to one locating structure 12 of a complimentary locating-structure pair 18 as a result of being integrally molded or cast into parent material 15 thereof a locating-point insert 14 may or may not be directly engaged to the locating structure 12 of the complimentary locating-structure pair 18 that is complimentary to the locating structure 12 thereof within the parent material 15 of which the locating-point insert 14 is integrally molded or cast. In some embodiments of the present invention a locating-point insert 14 may be engaged to the locating structure 12 complimentary to the one within the parent material 15 of which it is integrally molded or cast only through other portions of the locating structure 12 within which it is integrally molded or cast, as is well illustrated in FIGS. 11 and 19. Alternatively, as is shown in FIGS. 1, 4, 5, 6, 7, 8, 9, 10, 12, 14, 18, 19 and 21, a locating-point insert 14 may be directly engaged to the locating structure 12 that is complimentary to the one within the parent material 15 of which it is integrally molded or cast.

The extent to which the construction and engagement to one another of the locating structures 12 of a complimentary locating-structure pair 18 effects constriction of relative movement between those locating structures 12 may vary greatly. The locating structures 12 of a complimentary locating-structure pair 18 may be constructed and fixedly engaged to one another such that all relative movement therebetween is prevented in all directions in all circumstances. An example of such a construction and fixed engagement to one another of the locating structures 12 of a complimentary locating-structure pair 18 can be seen in each of FIGS. 10, 11, and 18. By contrast, the construction and engagement to one another of a mounted component 10 a mounting component 11 and the complimentary locating-structure pairs 18 thereof may be such that the locating structures 12 of one or more of the complimentary locating-structure pairs 18 constrict relative movement between themselves only in certain directions and/or only in certain circumstances. The construction and engagement to one another of a mounted component 10, a mounting component 11, and the complimentary locating-structure pairs 18 thereof may even be such that the directions and or extent that the locating structures 12 thereof constrain relative movement between themselves changes with changing circumstances. One example of such a construction of an assembly according to the present invention can be seen in FIG. 12. As can be seen in FIG. 12 the assembly illustrated therein comprises a complimentary locating-structure pair 18 that comprises a hinge 35 and portions of a mounted component 10 and a mounting component 11 to which the hinge 35 is engaged. This complimentary locating-structure pair 18 of the assembly of FIG. 12 that comprises the hinge 35 is an example of a complimentary locating-structure pair 18 that is constructed in such a manner that relative movement between the locating structures 12 that constitute it is only effected in some directions. The assembly illustrated in FIG. 12 also includes a complimentary locating-structure pair 18 that includes a spring 37 and the portions of the mounted component 10 and the mounting component 11 to which the spring 37 is engaged. This complimentary locating-structure pair 18, of the assembly of FIG. 12 that comprises the spring 37 is an example of a complimentary locating-structure pair 18 that is constructed in such a manner that the locating structures 12 thereof constrict relative movement between one another to different extents in different circumstances, such as different accelerations or loadings of the mounted component 10 and the mounting component 11. The assembly illustrated in FIG. 12 also includes a complimentary locating-structure pair 18 that includes a snubber 36 and an outer abutment-surface 16 of the mounted component 10. The complimentary locating-structure pair 18, of the assembly of FIG. 12 that comprises the snubber 36 and the outer abutment-surface 16 of the mounted component 10 is exemplary of a complimentary locating-structure pair 18 that is constructed in such a manner that the locating structures 12 thereof only restrict relative movement between one another in certain directions and only in certain circumstances. This complimentary locating-structure pair 18 that comprises the snubber 36 and the outer abutment-surface 16 of the mounted component 10 only constricts relative movement between these locating structures 12 in a vertical direction and such a constriction of movement between these locating structures 12 only occurs when sufficient force is applied to the mounted component 10 to compress the spring 37 to such an extent that the outer abutment-surface 16 of the mounted component 10 contacts the snubber 36.

It will be noted that in many embodiments of the present invention, when the locating structures 12 of a complimentary locating-structure pair 18 are engaged to one another, it can be difficult to discern which portions of the complimentary locating-structure pair 18 are part of each respective locating structure 12 of the mounted component 10 and the mounting component 11 respectively. Examples of such complimentary locating-structure pairs 18 for which it is difficult to determine which portions thereof are part of each respective locating structure 12 comprised by the complimentary locating-structure pair 18 are the complimentary locating-structure pair 18 that is illustrated in FIG. 12 and that includes the hinge 35 and also the complimentary locating-structure pair 18 that is illustrated in FIG. 12 and includes the spring 37. It is contemplated that, for practical purposes, it is not necessary to discern which portions of a complimentary locating-structure pair 18 are part of each respective locating structure 12 thereof. Nonetheless, it is submitted that any portion of the complimentary locating-structure pair 18 that could remain engaged to the mounted component 10, were the mounted component 10 intentionally separated from the mounting component 11 for reasons such as service, could be considered part of the locating structure 12 of the mounted component 10. Likewise, it is submitted that any portion of the complimentary locating-structure pair 18 that could remain engaged to the mounting component 11, were the mounted component 10 intentionally separated from the mounting component 11 for reasons such as service, could be considered part of the locating structure 12 of the mounting component 11. In the unlikely event that it is necessary or beneficial to identify which locating structure 12 each of the portions of a complimentary locating-structure pair 18 is part of, each portion of the complimentary locating-structure pair 12 could be identified as being part of one or the other locating structures 12 thereof using the guidelines set forth immediately above. One manner of determining which portions of a complimentary locating-structure pair 18 are part of the respective locating structures 12 thereof would be to determine which portions of the complimentary locating-structure pair 18 would be engaged to the mounted component 10 and the mounting component 11 respectively following execution of the most likely method of intentional disengagement of the locating structures 12 thereof from one another.

An assembly according to the present invention may comprise any number of complimentary locating-structure pairs 18, and while at least one of the complimentary locating-structure pairs 18 of an assembly according to the present invention comprises a locating-point insert 14 that is integrally molded or cast into parent material 15 of one of the locating structures 12 thereof, others of the complimentary locating-structure pairs 18 may not comprise locating-point inserts 14. Additionally, both of the locating structures 12 of a complimentary locating-structure pair 18 may comprise locating-point inserts 14 integrally molded or cast into parent material 15 thereof or, alternatively, only one of the locating structures 12 of a complimentary locating-structure pair 18 may have a locating-point insert 14 integrally molded or cast into parent material 15 thereof. Also, one or more of the locating structures 12 of a mounted component 10 and/or one or more of the locating structures of a mounting component 11 may comprise more than one locating-point insert 14 integrally molded or cast within parent material 15 of the locating structure 12.

Figure 1:
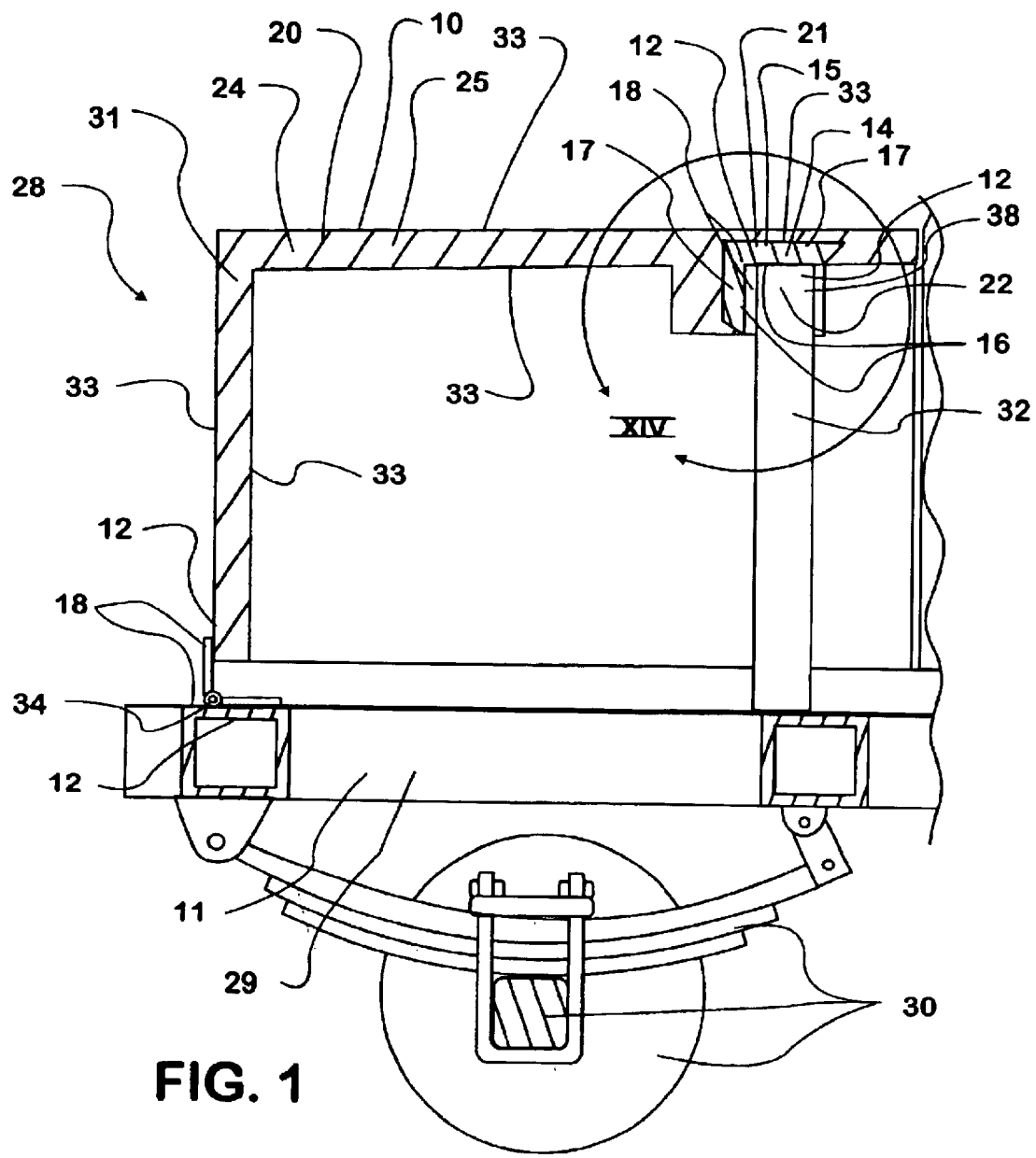
FIG. 1 is a sectional view through line I—I of FIG. 2 showing the engagement of a hood-support portion that is of female construction to a hood-support structure that is of male construction.
Figure 2:
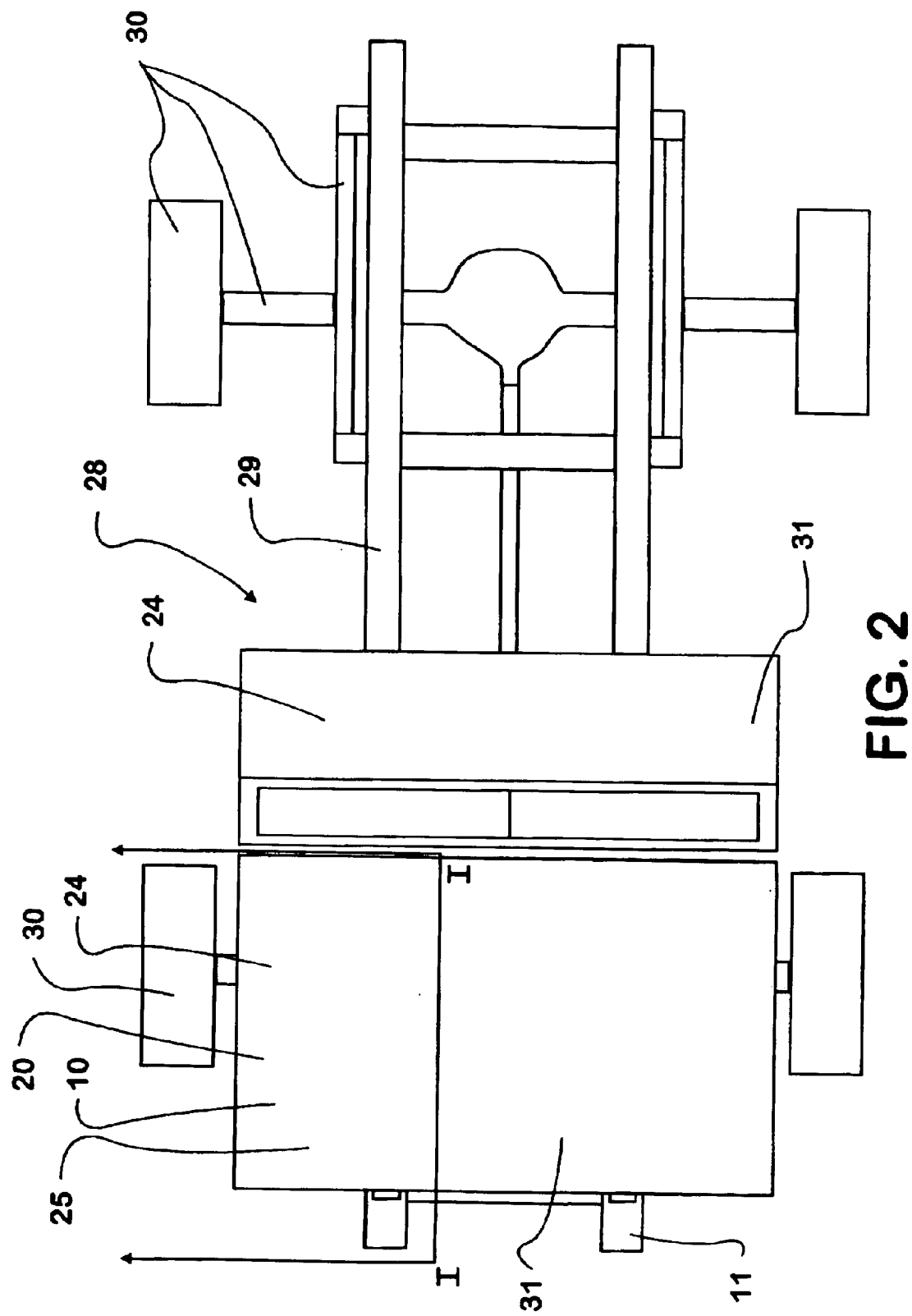
FIG. 2 is a plan view of vehicle that constitutes one embodiment of an assembly according to the present invention.
Figure 3:
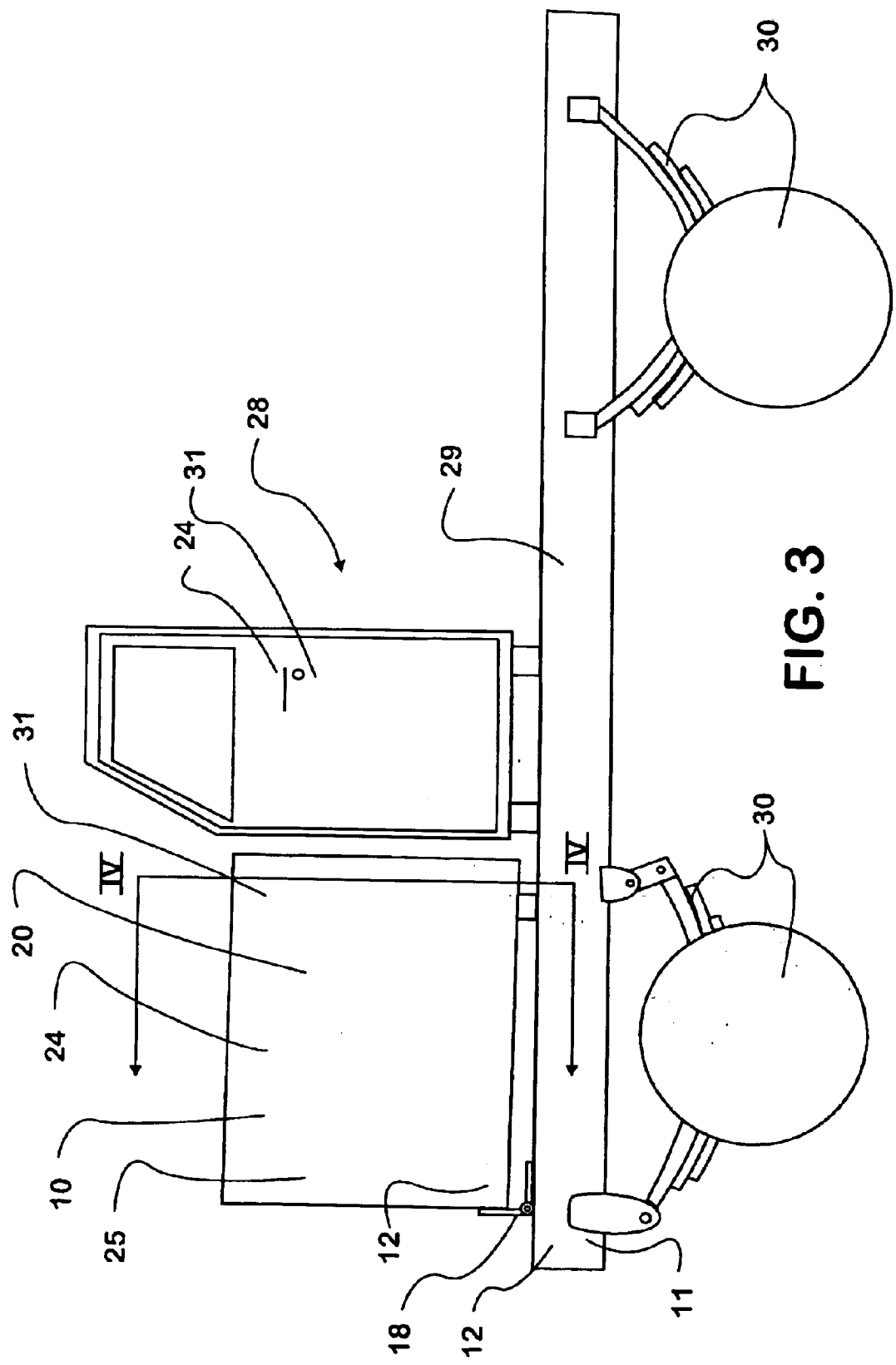
FIG. 3 is a side elevation view of the vehicle shown in FIG. 2.
Figure 4:
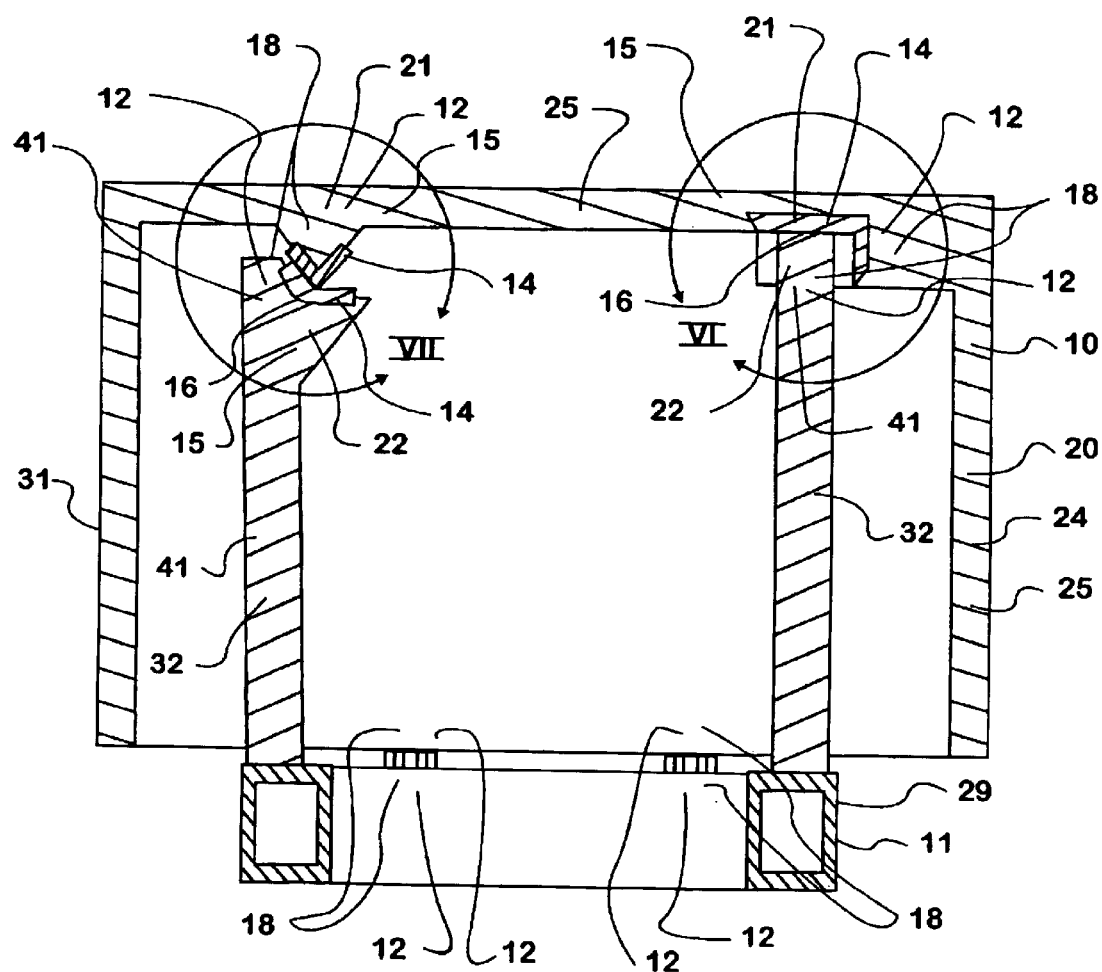
FIG. 4 is a sectional view through line IV—IV of FIG. 3 showing a complimentary locating-structure pair that comprises a hood-support portion of female construction and another complimentary locating-structure pair that comprises a hood-support portion of male construction.
Figure 5:
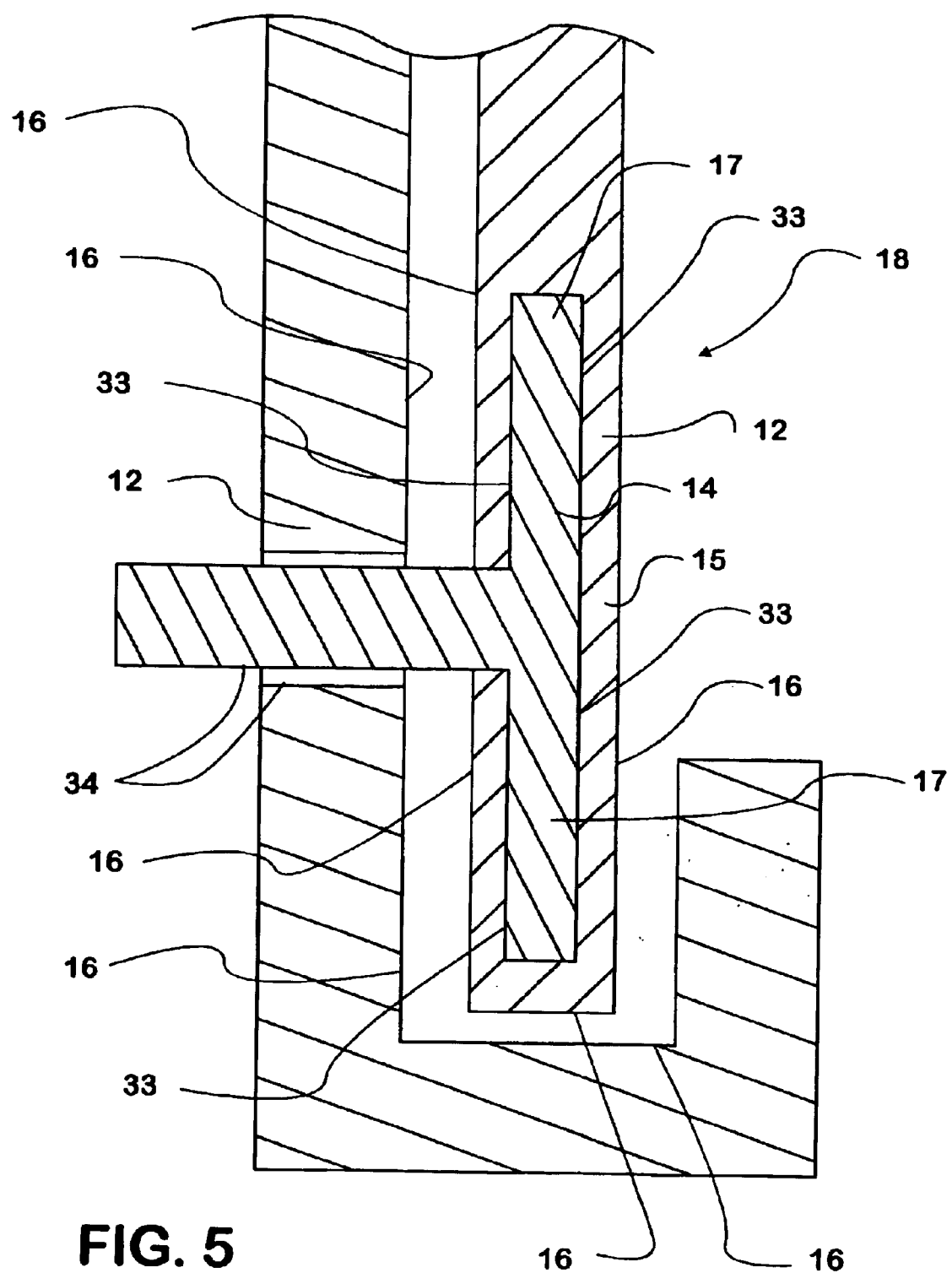
FIG. 5 shows, in section, a complimentary locating-structure pair that comprise locating structures that are of complimentary male and female constructions, but that also include one or more interlocking features that engage the locating structures to one another.
Figure 6:
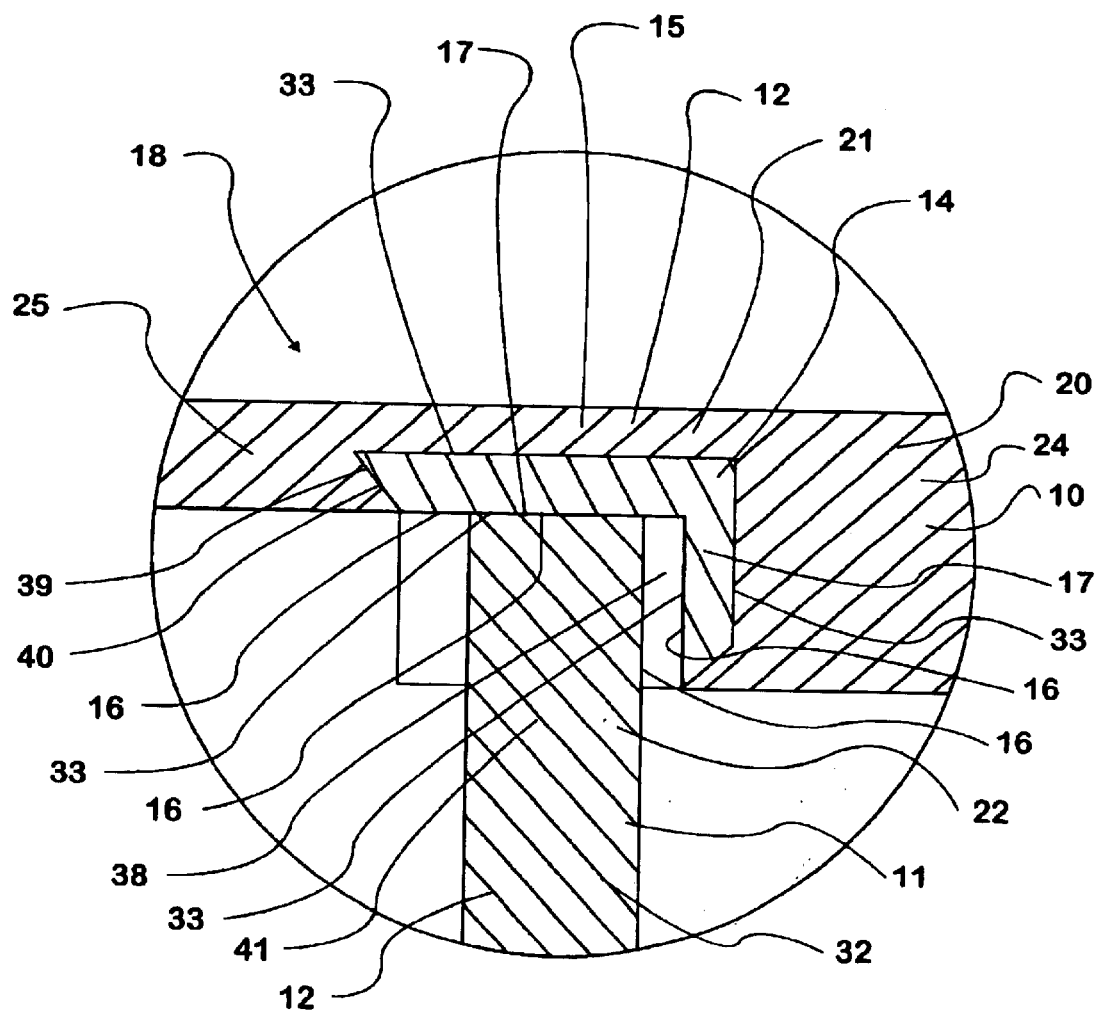
FIG. 6 is a view of the portion of FIG. 4 that is circumscribed by circle VI that shows in greater detail the complimentary locating-structure pair thereof that comprises a hood-support portion of female construction.
Figure 7:
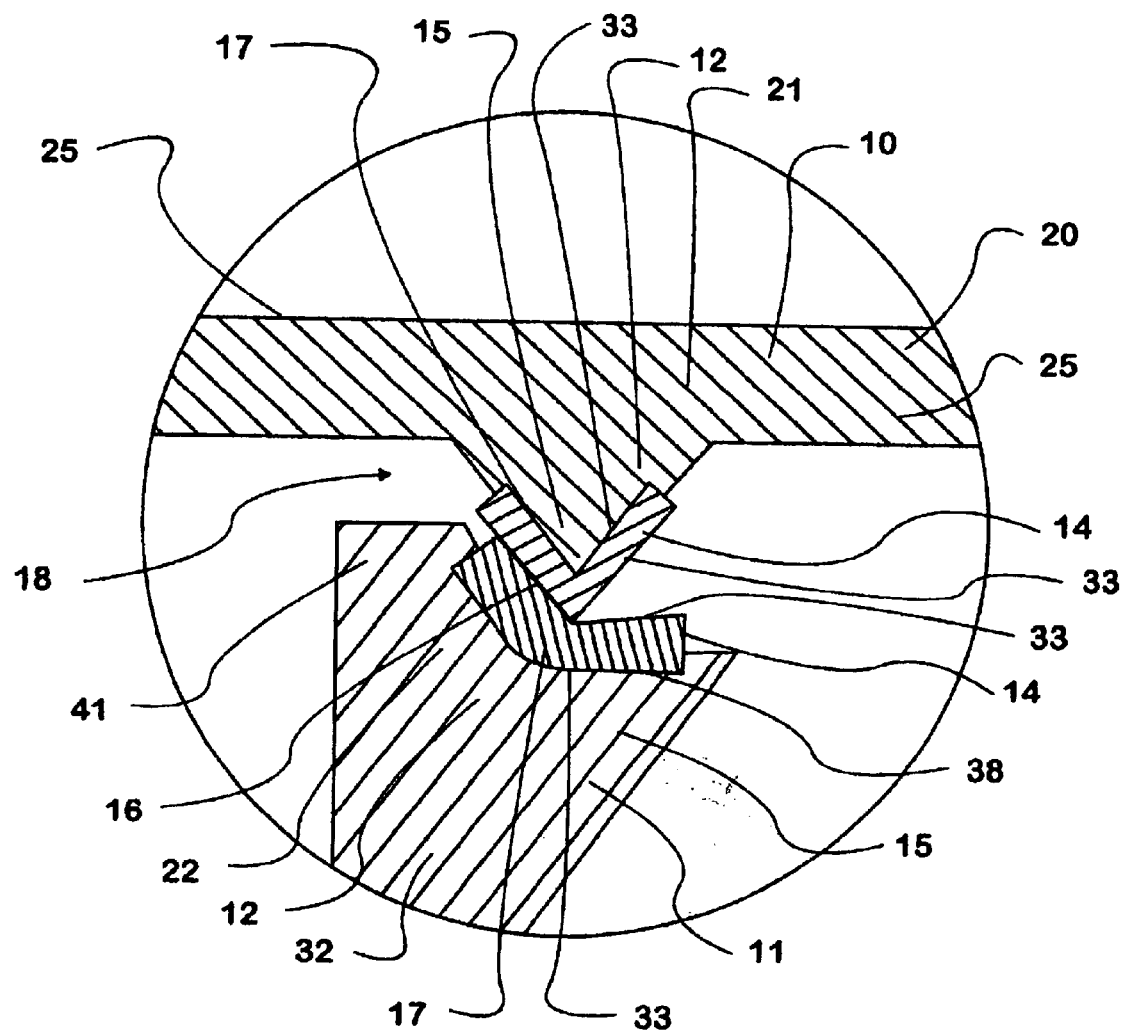
FIG. 7 is a view of the portion of FIG. 4 that is circumscribed by circle VII that shows in greater detail the complimentary locating-structure pair thereof that comprises a hood-support portion of male construction.

A given locating-point insert 14 comprised by a locating structure 12 according to the present invention may be completely immersed within the parent material 15 of the locating structure 12 within which it is integrally molded or cast as is best illustrated in FIGS. 11, 19, 20, and 23, or, alternatively, some portion of the locating-point insert 14 may extend out of the parent material 15 of the locating structure 12 within which it is integrally molded or cast as is illustrated in FIGS. 1, 4, 5, 6, 7, 8, 9, 10, 11, 12, 13, 14, 15, 16, 17, 18 and 21. As is best illustrated in FIGS. 7, 9, and 22, portions of a locating-point insert 14 that extend outwardly of the parent material 15 within which they are integrally molded or cast may jut out abruptly from the parent material 15 at the points in the outer surface of the locating structure 12 at which the parent material 15 and the locating-point insert 14 meet. Alternatively, as is well illustrated at least in FIGS. 6, 8, 12, 14, 15, 16, and 17, portions of a locating-point insert 14 that extend outwardly of the parent material 15 within which they are integrally molded or cast may be approximately flush with the parent material 15 at some or all of the points in the outer surface of the locating structure 12 at which the parent material 15 and the locating-point insert 14 meet. Such a smooth transition of the outer surface of a locating structure 12 from a portion thereof defined by the parent material 15 to a portion thereof defined by a locating-point insert 14 allows for smooth sliding of objects across the transition between the portion of the outer surface of the locating structure 12 that is defined by the parent material 15 and the portion of the outer surface of the locating structure 12 that is defined by the locating-point insert 14. In some embodiments of the present invention portions of a locating-point insert 14 that are substantially flush with adjacent portions of the parent material 15 that the locating-point insert 14 is integrally molded or cast into may not be exactly flush therewith as a result of unavoidable effects of a particular manner of molding or casting the locating-point insert 14 into the parent material 15. For example, when a locating-point insert 14 is integrally molded or cast into parent material 15 of a locating structure 12 the parent material 15 and the locating-point insert 14 may have temperatures considerably greater than ambient and may be exactly flush with one another immediately after the molding of the locating-point insert 14 into the parent material 15, but upon cooling the parent material 15 and the locating-point insert 14 may contract to a different extent and thus cause the parent material 15 and the locating-point insert 14 to no longer be exactly flush with one another. It is contemplated that in many applications such deviations from perfect flushness of portions of a locating-point insert 14 and parent material 15 that define adjacent portions of an outer surface of a locating structure 12 would not hinder the functionality of the locating structure 12 as compared to achievement of perfect flushness of those portions.

In some embodiments of the present invention portions of the locating structures 12 of a complimentary locating-structure pair 18 abut each other at outer abutment-surfaces 16 defined by the locating structures 12, such embodiments being illustrated in at least FIGS. 1, 4, 6, 7, 8, 9, 11, 12, 14, 19, 21, and 22. In some embodiments of the present invention the locating structures 12 of one or more locating-structure pairs 18 engage one another only through such abutment between outer abutment-surfaces 16 thereof, such embodiments being illustrated at least in FIGS. 1, 4, 6, 7, 8, 9, 12, 14, 21, and 22. In some embodiments of the present invention surfaces of portions of locating-point inserts 14 that are disposed outwardly of the parent material 15 within which the locating-point inserts 14 are integrally molded or cast define at least part of an outer abutment-surface 16 of a locating structure 12 that comprises it, such embodiments being illustrated at least in FIGS. 1, 4, 6, 7, 8, 9, 12, 14, 21, and 22. In some embodiments of the present invention the mounted component 10, the mounting component 11, and the complimentary locating-structure pairs 18 of an assembly are constructed and engaged to one another in such a manner that, as a result of normal usage of the assembly, the mounted component 10 and the mounting component 11 may move relative to one another in such a manner that outer abutment-surfaces 16 of the locating structures 12 of one or more complimentary locating-structure pairs 18 may slide against one another. FIGS. 1, 4, 6, 7, 8, 9, 14, 21, and 23 illustrate embodiments of assemblies according to the present invention that have a mounted component 10, a mounting component 11, and complimentary locating-structure pairs 18 thereof that are constructed and engaged to one another in such a manner that normal usage of the assembly could cause outer abutment-surfaces 16 of the locating structures 12 of one or more of the complimentary locating-structure pairs 18 to slide against one another. In addition to those embodiments illustrated in FIGS. 1, 4, 6, 7, 8, 9, 14, 21, and 23 there are innumerable other constructions of assemblies according to the present invention that are well-known to and/or easily imaginable by one of ordinary skill in the art in which the mounted component 10, the mounting component 11, and the complimentary locating-structure pairs 18 thereof are constructed and engaged to one another in such a manner that outer abutment-surfaces 16 of the locating structures 12 of one or more of the complimentary locating-structure pairs 18 would slide against one another. Such movement between a mounting component 10 and a mounting component 11 of an assembly according to the present invention that causes sliding against one another of outer abutment-surfaces 16 of locating structures 12 of the mounted component 10 and the mounting component 11 may be movement that is necessary for the assembly to perform its function. Alternatively, as is often the case, such movement between a mounting component 10 and a mounting component 11 of an assembly according to the present invention that causes sliding against one another of outer abutment-surfaces 16 of locating structures 12 of the mounted component 10 and the mounting component 11 may be movement that would not occur were it not for a need to implement compromises in the construction of the assembly for reasons such as cost and space constraints. For example, the mounted component 10, mounting component 11, and/or the complimentary locating-structure pairs 18 of an assembly may be of less than ideal stiffness such that changes in the direction and/or magnitude of the acceleration of the mounting component 11 may cause the mounting component 11, one or more of the complimentary locating-structure pairs 18, and/or the mounted component 10 to elastically deform to different shapes and to, thus, cause shifting of various ones of the locating structures 12 relative to complimentary locating structures 12 that they are engaged to. In many assemblies according to the present invention such relative shifting of the locating structures 12 of complimentary locating-structure pairs 18 is accommodated by constructing those locating structures 12 to slideably abut one another at outer abutment-surfaces 16. Of course it will be understood that there are any number of other reasons that an assembly according to the present invention may include locating structures 12 that are engaged to one another in such a manner that outer abutment-surfaces 16 of the locating structures 12 may slide against one another as a result of normal usage of the assembly. In some embodiments of the present invention, such as those shown in FIGS. 1, 4, 6, 7, 8, 9, 12, and 14 one or more of the outer abutment-surfaces 16 of a locating structure 12 that may slide against outer abutment-surfaces 16 of another locating structure 12 are defined by portions of a locating-point insert 14 that are disposed outwardly of the parent material 15 within which the locating-point insert 14 is integrally molded or cast. In some embodiments of the present invention, one or more locating-point inserts 14 that define outer abutment-surfaces 16 that are slideably abuttingly engaged to outer abutment-surfaces 16 of other locating structures 12 are constructed of material that is more wear-resistant than the parent material 15 within which the locating-point insert 14 is integrally molded or cast. Integrally molding or casting into parent material 15 of a locating structure 12 a locating-point insert 14 that is constructed of material that is more wear-resistant than the parent material 15 and that is constructed and positioned to define an outer abutment-surface 16 of the locating structure 12 is a cost effective way to provide the locating structure 12 with excellent wear resistance.

In some embodiments of the present invention one or more of the complimentary locating-structure pairs 18 comprise locating structures 12 that are of cooperating male and female constructions, as is illustrated at least in FIGS. 6, 7, 14, 21, and 24. A locating structure 12 that is of a female construction defines two or more outer abutment-surfaces 16 that are disposed at an angle of less than 180 degrees relative to one another and that, thus, define a recess 38 between them within which a locating structure 12 of male construction may reside. A locating structure 12 that is of a male construction defines two or more outer abutment-surfaces 16 that are disposed at an angle of greater than 180 degrees relative to one another. A complimentary locating-structure pair 18 that comprises locating structures 12 that are of cooperating male and female construction comprises locating structures 12 that are of male and female construction respectively and that are constructed in such a manner that the locating structure 12 of male construction may be inserted and retracted from the recess 38 defined by the locating structure 12 of female construction by simply translating them in an insertion/retraction direction relative to one another. It will of course be understood that a complimentary locating-structure pair 18 that comprises locating structures 12 of cooperating male and female construction may have more than one insertion/retraction direction in which the locating structures 12 can be translated relative to one another in order to engage them to one another. Thus, locating structures 12 of cooperating male and female constructions can be easily engaged to and disengaged from one another. Once engaged to one another locating structures 12 of cooperating male and female constructions prevent relative movement between one another in at least two directions as a result of abutment between the outer abutment-surfaces 16 defined thereby. In some embodiments of the present invention the outer abutment-surfaces 16 defined by a locating structure 12 of female construction may be defined by portions of a locating-point insert 14 that is integrally molded or cast into parent material 15 of the locating structure 12, as is illustrated at least in FIGS. 6, 7, 14, 21, and 24. Likewise, in some embodiments of the present invention the outer abutment-surfaces 16 defined by a locating structure 12 of male construction may be defined by portions of a locating-point insert 14 that is integrally molded or cast into parent material 15 of the locating structure 12, as is illustrated at least in FIGS. 7 and 24.

Figure 10:
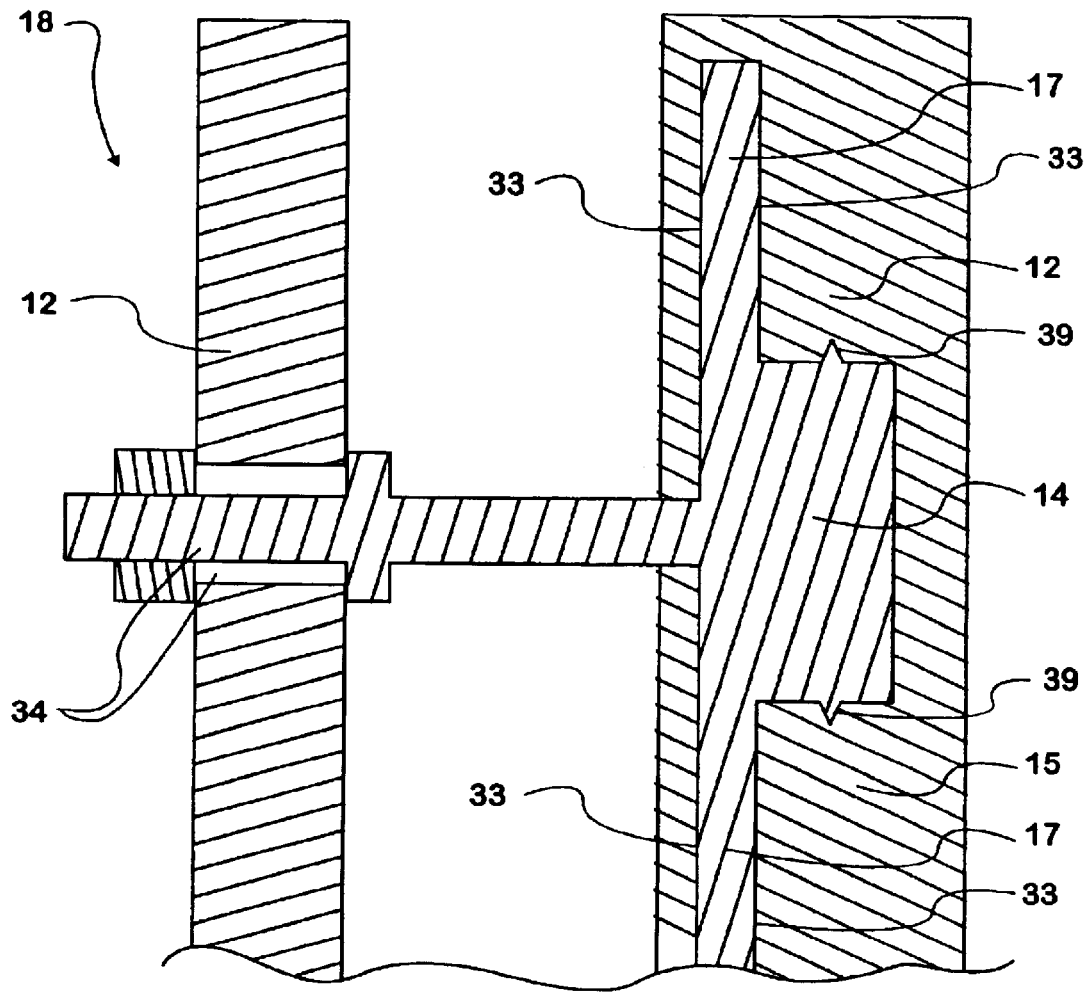
FIG. 10 shows, in section, one embodiment of a complimentary locating-structure pair in accordance with the present invention in which one of the locating structures thereof that has a locating-point insert integrally molded or cast into parent material thereof is directly fixedly engaged to the locating structure that is complimentary to it through the locating-point insert.
Figure 11:
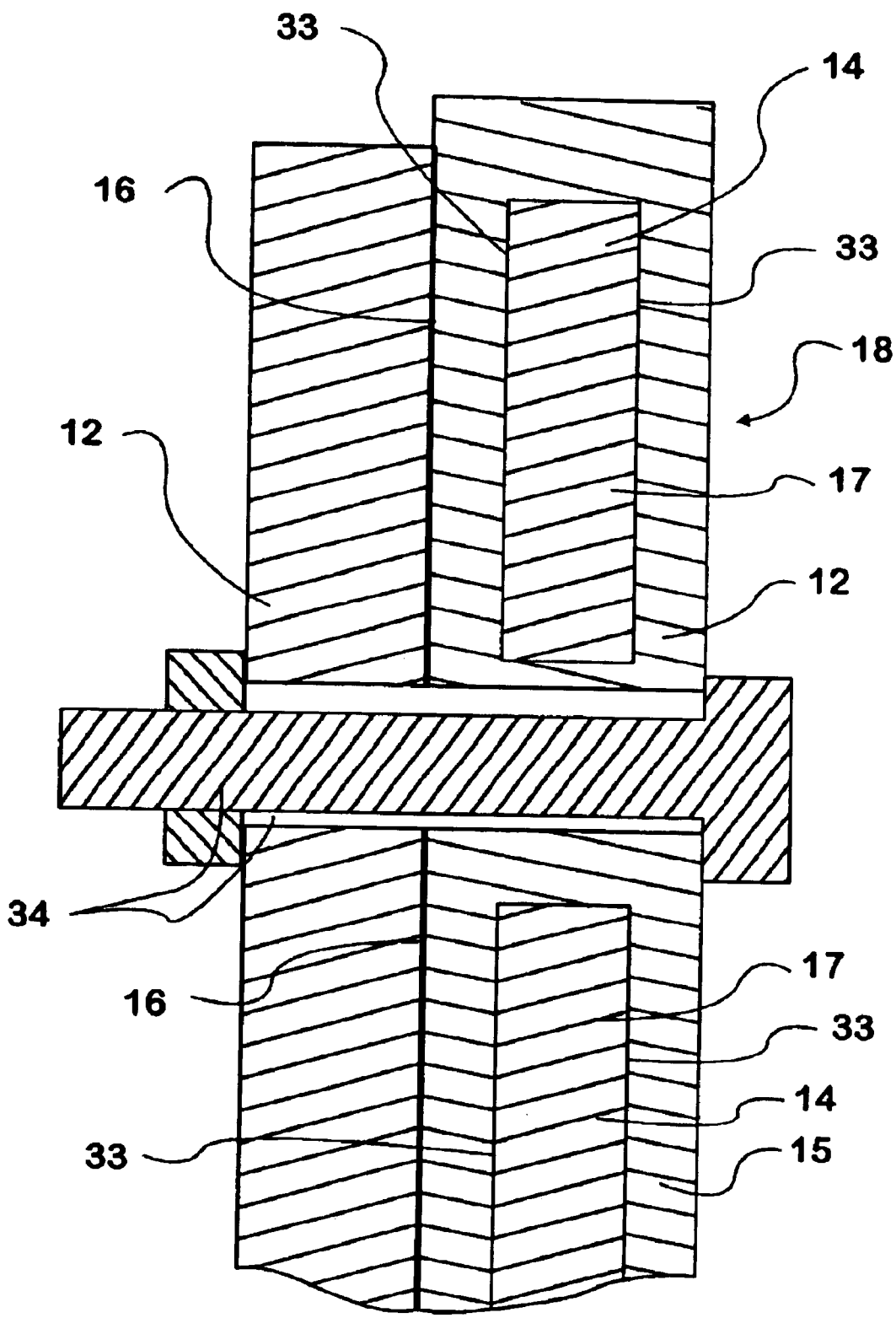
FIG. 11 shows, in section, one embodiment of a complimentary locating-structure pair in accordance with the present invention in which a locating-point insert integrally molded or cast into parent material of one of the locating structures thereof is only engaged indirectly to the locating structure that is complimentary to the one within parent material of which it is integrally molded or cast.
Figure 19:
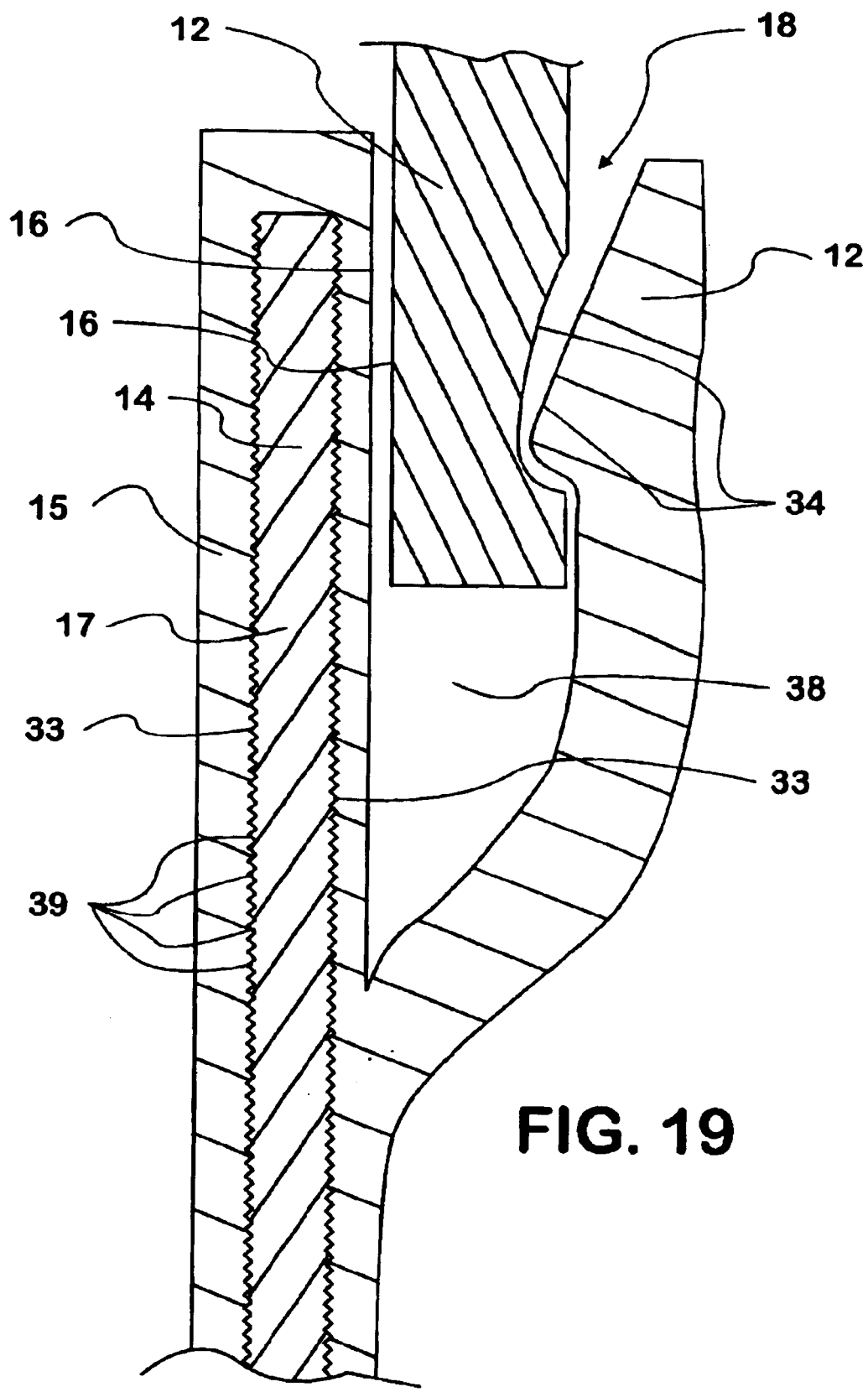
FIG. 19 illustrates, in section, one embodiment of a complimentary locating-structure pair that comprises locating structures that are engaged to one another through interlocking features and one of which locating structures comprises a locating-point insert that is entirely immersed within parent material thereof within which it is integrally molded or cast.
Figure 20:
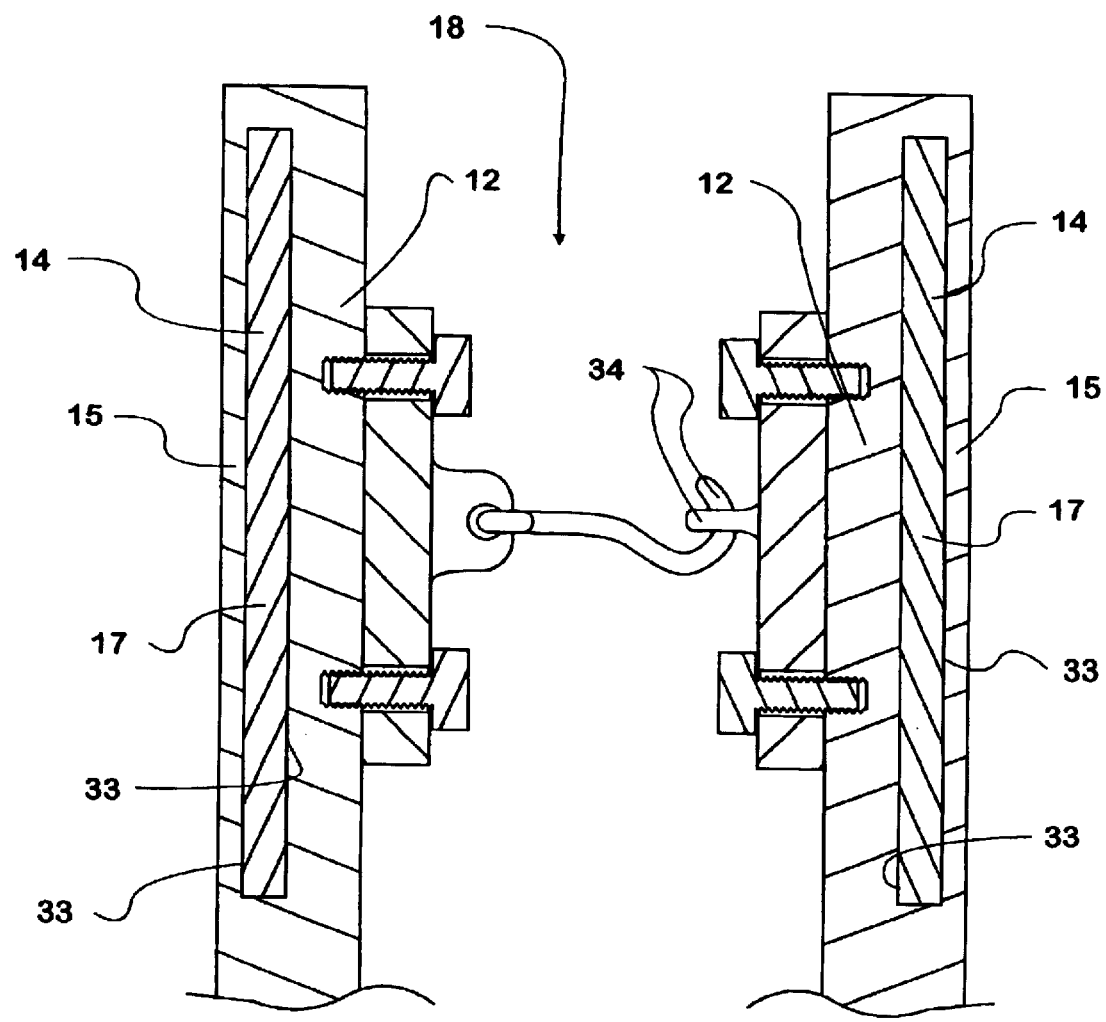
FIG. 20 illustrates, in section, one embodiment of a complimentary locating-structure pair in which both locating structures thereof comprise locating-point inserts that have sheet-body portions major faces of which face in directions in which relative movement is constrained between the locating structures thereof.
Figure 21:
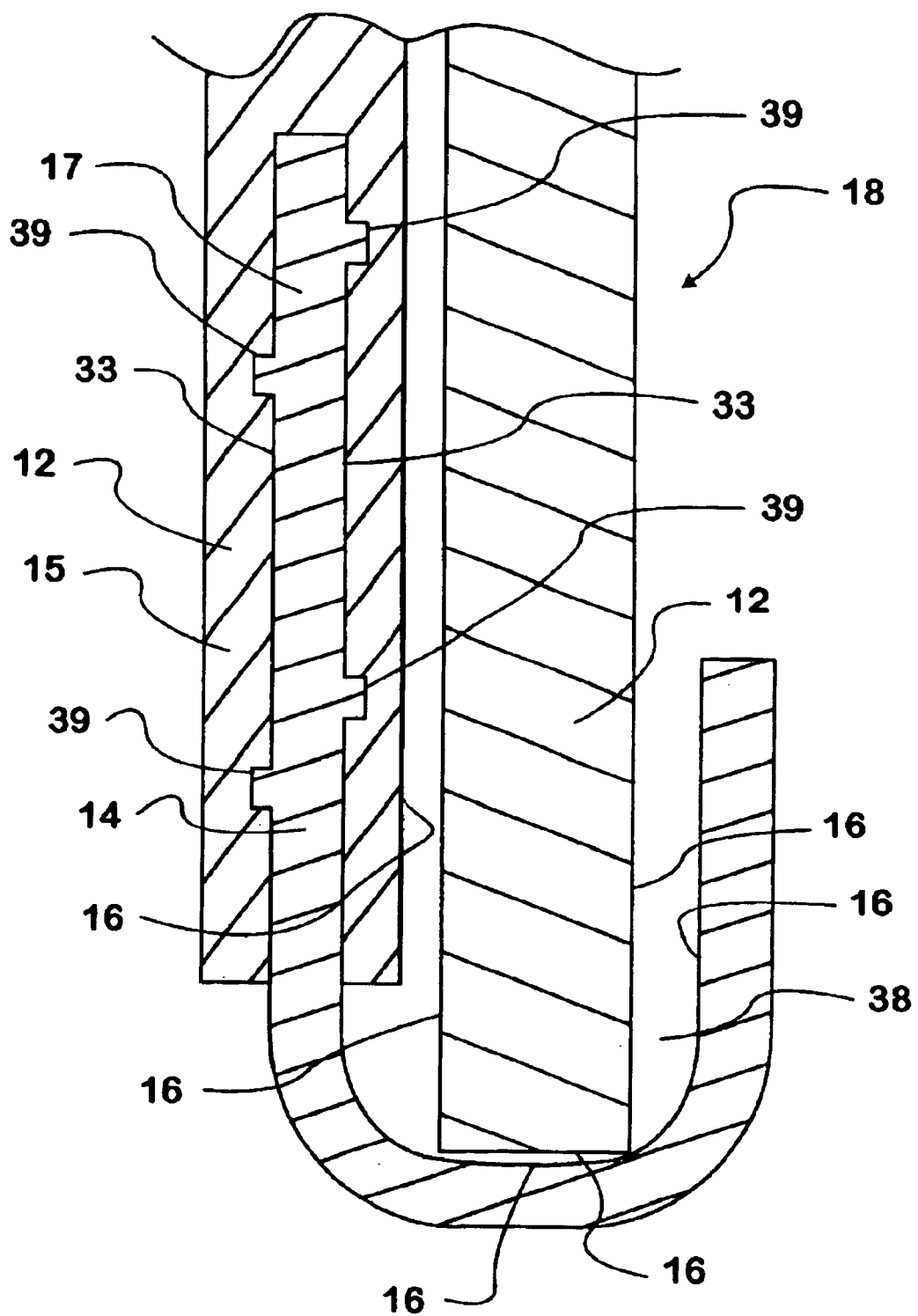
FIG. 21 illustrates, in section, one embodiment of a complimentary locating-structure pair in which one of the locating-structures thereof is of a female construction and in which the locating-point insert comprised thereby defines some of the major surfaces that effect that locating-point insert's categorization as being of a female construction.

A locating-point insert 14 according to the present invention may have any shape that is not in disagreement with the teachings of this disclosure. In some embodiments of the present invention one or more locating-point inserts 14 have at least one sheet-body portion 17. A sheet-body portion 17 of a locating-point insert 14 is a portion thereof that is in the form of a sheet body. The term sheet body as it is used within this disclosure is intended to mean a body of matter that has two major surfaces 33 each of which extends approximately parallel to the other along substantially its entire extent and which two major surfaces 33 in aggregate comprise the majority of the surface area of the body of matter. It will be understood that the major surfaces 33 of a sheet body are not necessarily planar in shape. Some locating-point inserts 14 in accordance with the present invention, such as those illustrated in FIGS. 5, 10, 18, and 22, comprise one or more sheet-body portions 17 that are engaged to other portions of the locating-point insert 14 that are not in the form of sheet bodies. Other locating-point inserts 14 according to the present invention, such as those shown in 1, 4, 6, 7, 8, 13, 14, 15, 16, 17, 19, 21, and 23 are constructed entirely of sheet-body portions 17. Of course it will be understood that, for the purposes of this disclosure, the inclusion of one or more anchoring features 39 of a relatively small size on major faces 33 of a sheet-body portion 17 would not negate its categorization as a sheet-body portion 17 of the locating-point insert 14. For example the locating-point inserts 14 shown in FIGS. 21 and 19 are constructed entirely of sheet-body portions 17 some of which have anchoring features 39 of a relatively small size defined on major surfaces 33 thereof. Sheet-body portions 17 of a locating-point insert 14 provide a particularly cost effective and space efficient means for distributing within the locating structures 12 of a complimentary locating-structure pair 18 forces that are transmitted between the locating structures 12 in directions in which the major surfaces 33 of the sheet-body portions 17 face. Sheet-body portions 17 of a locating-point insert 14 also provide a particularly cost effective and space efficient means for reinforcing a locating structure 12 that comprises the locating-point insert 14 against forces applied to it in the directions in which the major surfaces 33 of the sheet-body portions 17 face. Some embodiments of the present invention comprise one or more locating-point inserts 14 that comprise one or more sheet-body portions 17 that have one or more major surfaces 33 thereof that face in directions in which relative movement is constrained between the locating structure 12 that comprises the locating-point insert 14 and the other locating structure 12 of the complimentary locating-structure pair 18, which directions are also directions in which forces are transmitted between the locating structures 12. For instance, an embodiment of the present invention that are so configured can be seen in FIG. 10. The complimentary locating-structure pair 18 that is illustrated in FIG. 10 includes locating structures 12 that are constructed and engaged to one another in such a manner that relative movement between them is constrained in directions that are lateral within the illustration. It can also be seen in FIG. 10 that one of the locating structures 12 illustrated therein comprises a locating-point insert 14 that comprises sheet-body portions 17 that have major surfaces 33 that face in directions that are lateral within FIG. 10. Other examples of embodiments of the present invention that include complimentary locating-structure pairs 18 that have one or more locating-point inserts 14 with sheet-body portions 17 that have major surfaces 33 that face in directions in which relative movement is constrained between the locating structures 12 of the complimentary locating-structure pair 18 that comprises the locating-point insert 14 can be seen in FIGS. 1, 4, 5, 6, 7, 8, 9, 10, 11, 12, 14, 18, 19, 20, 21, 22, 23, and 24. By contrast, the embodiment of a complimentary locating-structure pair 18 that is illustrated in FIG. 25 is not so configured.

Additionally, some embodiments of the present invention include locating structures 12 that comprise locating-point inserts 14 that are integrally molded or cast into parent material 15 thereof and that comprise one or more sheet-body portions 17 one or more major surfaces 33 of which form outer abutment-surfaces 16 of the locating structure 12. For instance, FIG. 22 illustrates a complimentary locating-structure pair 18 that comprises locating-point inserts 14 that are integrally molded or cast into parent material 15 of one of the locating structures 12 thereof and that has a sheet-body portion 17 a major surface 33 of which is disposed outwardly of the parent material 15 and is in abutment with the other locating structure 12 of the complimentary locating-structure pair 18. Those portions of the major surface 33 of the one or more sheet-body portions 17 of the locating-point insert 14 shown in FIG. 22 that are in abutment with the locating structure 12 that does not comprise the locating-point insert 14 are outer abutment-surfaces 16 by virtue of their being in abutment with the locating structure 12 that does not comprise the locating-point insert 14. Other embodiments of the present invention that include one or more locating-point inserts 14 that have sheet-body portions 17 major surfaces 33 of which are outer abutment-surfaces 16 of the locating structure 12 within the parent material 15 of which the locating-point insert 14 is integrally molded or cast are illustrated in FIGS. 1, 4, 6, 7, 8, 9, 12, 14, 21, and 24. Construction of a locating structure 12 in such a manner with an outer abutment-surface 16 thereof defined by major surfaces 33 of one or more sheet-body portions 17 of a locating-point insert 14 integrally molded or cast into the parent material 15 thereof is a space efficient manner of providing strength, stiffness, and/or wear-resistance to the portion of the locating-structure 12 that defines and supports that outer abutment-surface 16.

The parent material 15 of a locating structure 12 into which a locating-point insert 14 is integrally molded or cast according to the present invention may be any material or combination of materials into which the locating-point insert 14 can be integrally molded or cast and that suits the conditions under which the locating structure 12 will be made and used. The parent material 15 into which a locating-point insert 14 is integrally molded or cast may be any combination of one or more of metal, plastic, ceramic, elastomers, adhesives, concrete, or any other material into which the locating-point insert 14 may be integrally molded or cast. One type of plastic that the parent material 15 into which one or more locating-point inserts 14 may be integrally molded or cast is SMC (sheet molded composite) which is a plastic material that is well-known to use in the construction of vehicle body panels. The material or combination of materials that a locating-point insert 14 according to the present invention may be constructed of may be any material or combination of materials that can be integrally molded or cast into the parent material 15 of the locating structure 12 and that comprises at least one material that is harder, stiffer, more wear-resistant, and/or stronger than the parent material 15 into which it is integrally molded or cast. A locating-point insert 14 may be constructed of any combination of one or more of metal, plastic, ceramics, elastomers, organic materials, concrete, or any other material that satisfies the above outlined criteria for the material (s) that the locating-point insert 14 must be constructed of. One type of plastic that a locating-point insert 14 in accordance with the present invention may be constructed of is Nylon.

Figure 15:
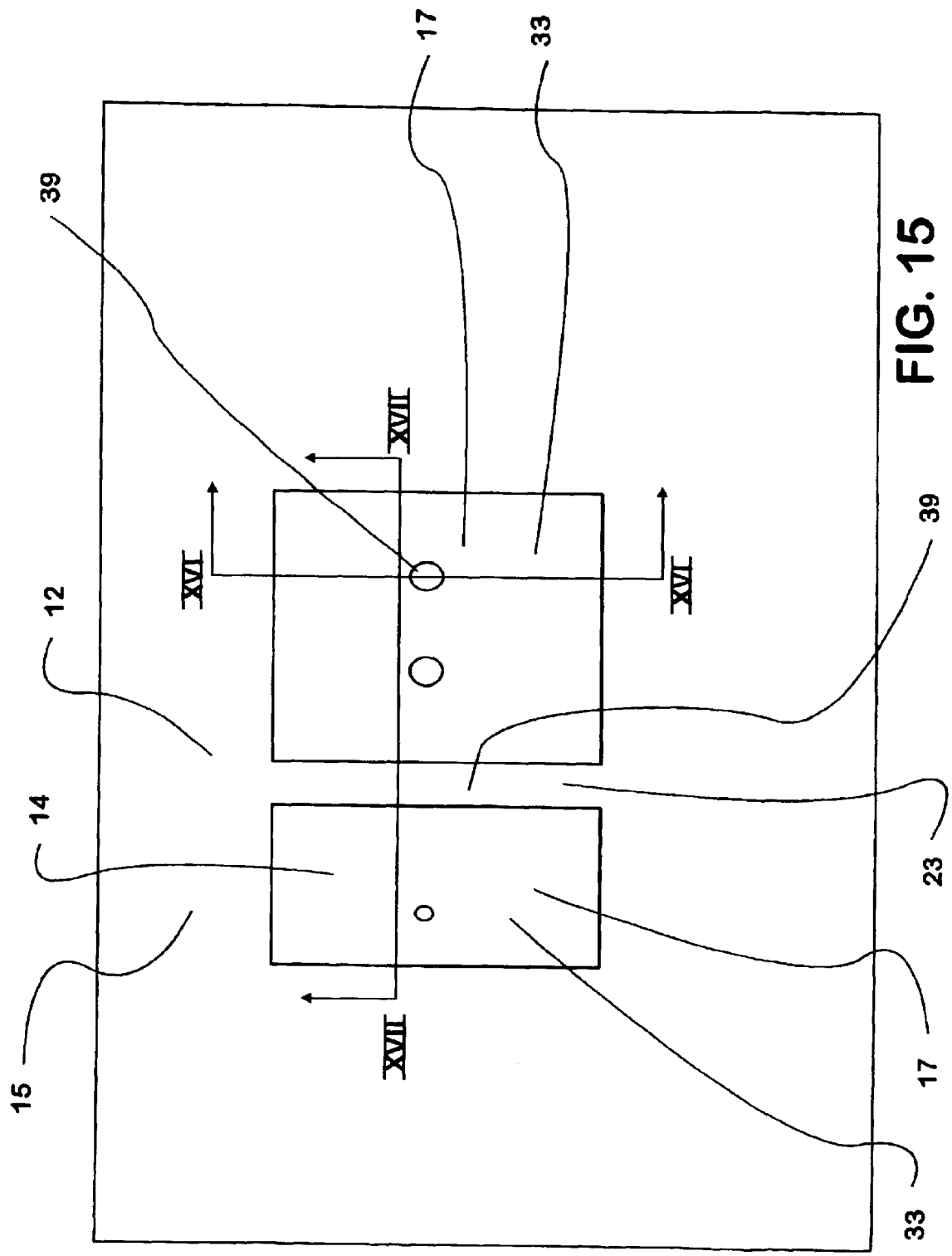
FIG. 15 is a plan view of a locating structure with a locating-point insert that has anchoring features including a beveled edge and an anchoring channel that is integrally molded or cast into the parent material of the locating structure.
Figure 16:
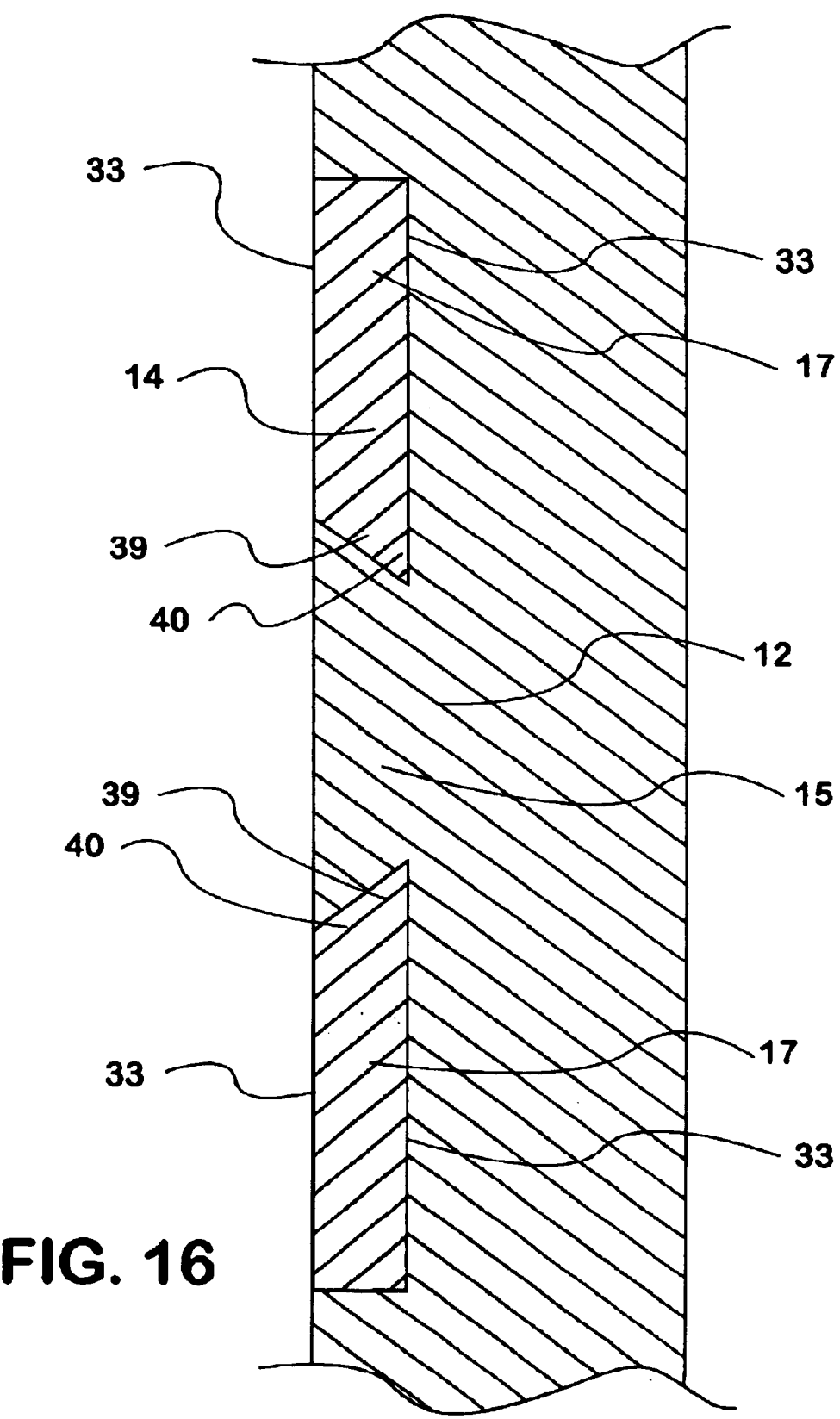
FIG. 16 is a section view through line XVI—XVI of FIG. 15 showing the engagement of the beveled edge of the locating-point insert thereof to the parent material within which the locating-point insert is integrally molded or cast.
Figure 17:
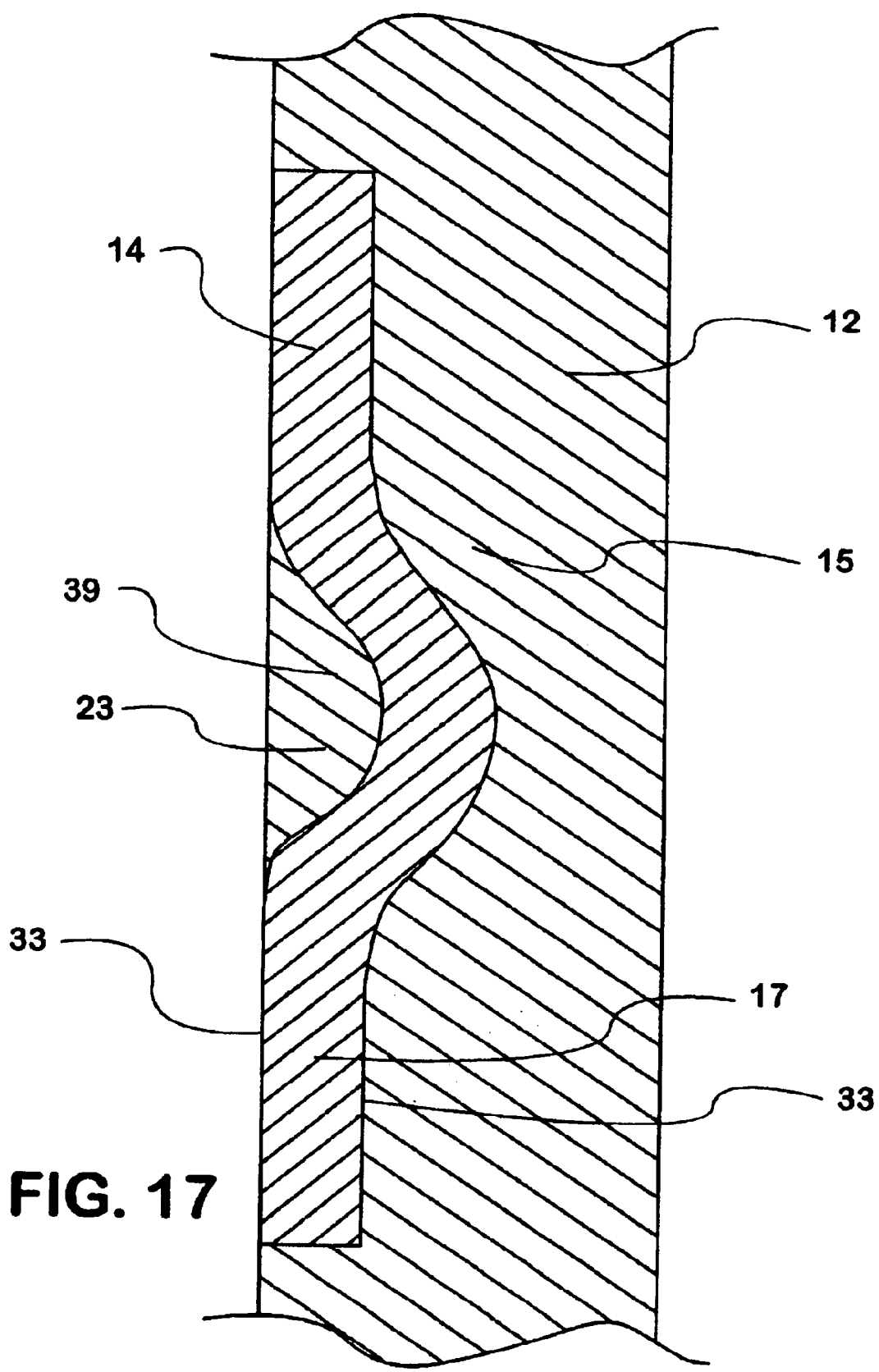
FIG. 17 is a sectional view through line XVII—XVII of FIG. 15 showing the engagement of the anchoring channel of the locating-point insert thereof to the parent material within which it is integrally molded or cast.
Figure 18:
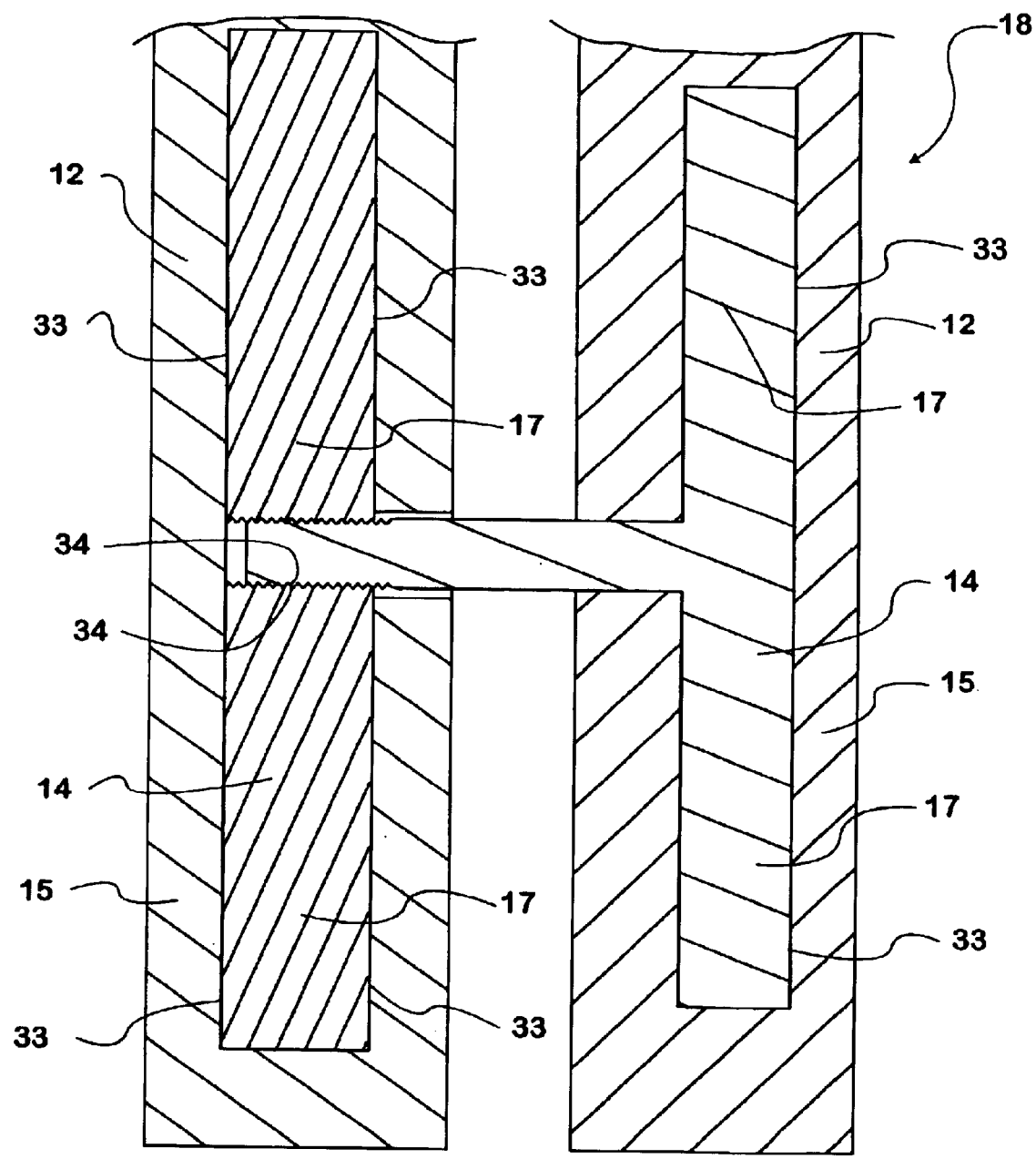
FIG. 18 illustrates, in section, one embodiment of a complimentary-locating structure pair in which the locating structures both comprise locating-point inserts integrally molded or cast into parent material of their respective locating structures and that are directly engaged to one another through interlocking features.

A locating-point insert 14 according to the present invention may comprise one or more anchoring features 39 that strengthen the attachment between the locating-point insert 14 and the parent material 15 into which it is integrally molded or cast. Embodiments of the present invention that have locating-point inserts 14 with anchoring features 39 are shown in FIGS. 10, 19, and 21. Anchoring features 39 of a locating-point insert 14 are portions of the locating-point insert 14 that either jut out from adjacent portions of the locating-point insert 14 into the parent material 15 and that are, thus, sandwiched by the parent material 15 into which they jut or recesses defined in the locating-point insert 14 into which the parent material 15 may jut and thus be sandwiched between the portions of the locating-point insert 14 that define the recess. Some different types of anchoring features 39 that strengthen the attachment between a locating-point insert 14 and the parent material 15 into which the locating-point insert 14 is integrally molded or cast include recesses, tabs, knurling, stubs, bumps, chamfered edges 40, and anchoring channels 23. FIGS. 15 and 16 illustrate a locating-point insert 14 that has a chamfered edge 40. In the embodiment shown in FIGS. 15 and 16 the chamfered edge 40 is defined at a perimeter of an aperture in a portion of the locating-point insert 14 that has an outer surface that extends out of the parent material 15 into which the locating-point insert 14 is integrally molded or cast. In the embodiment shown in FIGS. 15 and 16 the chamfered edge 40 extends into the parent material 15 and is sandwiched therebetween as it extends away from the portion of the locating-point insert 14 from which it depends. The sandwiching of the chamfered edge 40 shown in FIGS. 15 and 16 between the portions of the parent material 15 into which it extends strengthens the attachment between the locating-point insert 14 and the parent material 15 against retraction of the locating-point insert 14 from the parent material 15 in directions perpendicular to the direction in which the chamfered edge 40 extends from the portion of the locating-point insert 14 from which it depends. Embodiments of the present invention that include a locating-point insert 14 with an anchoring channel 23 are shown in FIGS. 15 and 17. As can be seen in FIGS. 15 and 17, an anchoring channel 23 according to the present invention is a channel that is defined by outer surfaces of a locating-point insert 14 and within which is disposed a portion of the parent material 15 into which the locating-point insert 14 is integrally molded or cast. The parent material 15 that is disposed within an anchoring channel 23 and is sandwiched between the side walls of the anchoring channel 23 strengthens the attachment between the parent material 15 and the locating-point structure 23 in directions perpendicular to the side walls of the anchoring channel 23. As is illustrated by FIGS. 15 and 17 according to some embodiments of the present invention an anchoring channel 23 of a locating-point insert 14 may extend from one or more outer edges of an outer surface of the locating-point insert 14 and may even extend continuously along an outer surface of a locating-point insert 14 between two outer edges of the outer surface. Additionally, as can be seen in FIGS. 15 and 17, in some embodiments of the present invention a locating-point insert 14 that defines an anchoring channel 23 that extends from an outer edge of an outer surface of the locating-point insert 14 is integrally molded or cast into parent material 15 in such a manner that the portion of the of the anchoring channel 23 disposed at the outer edge of the surface of the locating-point insert 14 is disposed within the parent material 15 while portions of the outer surface of the locating-point insert 14 adjacent the anchoring channel 23 are disposed outside of the parent material 15. In some embodiments of the present invention, such as the one shown in FIGS. 15 and 17, a locating-point insert 14 may have an anchoring channel 23 that extends continuously along an outer surface of the locating-point insert 14 between outer edges of the outer surface and the locating-point insert 14 may be integrally molded or cast into the parent material 15 in such a manner that the entire anchoring channel 23 is disposed within the parent material 15 and those portions of the surface, along which the anchoring channel 23 extends, that are separated by the anchoring channel 23 are disposed outside the parent material 15. Such constructions of the present invention in which a locating-point insert 14 is integrally molded or cast into parent material 15 in such a manner that an anchoring channel 23 thereof is disposed in parent material 15 while portions of the of the locating-point insert 14 that are separated by the anchoring channel 23 are disposed outside the parent material 15 effect sandwiching of the locating-point insert 14 between the parent material 15 that is disposed within the anchoring channel 23 and the parent material that is disposed upon a side of the locating-point insert 14 opposite a bottom wall of the anchoring channel 23. Such a sandwiching of a locating-point insert 14 between parent material 15 that is disposed in an anchoring channel 23 and parent material 15 that is disposed upon an opposite side of the locating-point insert 14 strengthens the attachment of the locating-point insert 14 to the parent material 15 against retraction of the locating-point insert 14 from the parent material 15. In some embodiments of the present invention portions of a locating-point insert 14 that are disposed outward of the parent material 15 within which it is integrally molded or cast and that are separated by an anchoring channel 23 define outer abutment-surfaces 16 that are abutted by a locating structure 12 that is complementary to the locating structure 12 that comprises the locating-point insert 14.

The mounted component 10 of an assembly according to the present invention may be virtually any type of component that is adapted to be mounted to a mounting component 11 through one or more complimentary locating-structure pairs 18 that comprise locating-point inserts 14 integrally molded or cast into the parent material 15 of one or more locating structures 12 thereof as is described throughout this disclosure. In some embodiments of the present invention the mounted component 10 is adapted to form part of an enclosure that physically separates two portions of space from one another. Such enclosures include among other types of assemblies, shelters within which living beings and/or valuable articles may be isolated from weather and body structures 31 of vehicles 28. Mounted components 10 according to the present invention that are or may be adapted to form a part of such an enclosure are illustrated in FIGS. 1, 2, 3, 4, 6, 7, 8, 9, and 12. A mounted component 10 according to the present invention that is adapted to form a portion of such an enclosure generally comprises a separator wall 25 that is a sheet body and that functions to isolate from one another the areas in space disposed upon opposite sides of the major surfaces 33 thereof.

Figure 13:
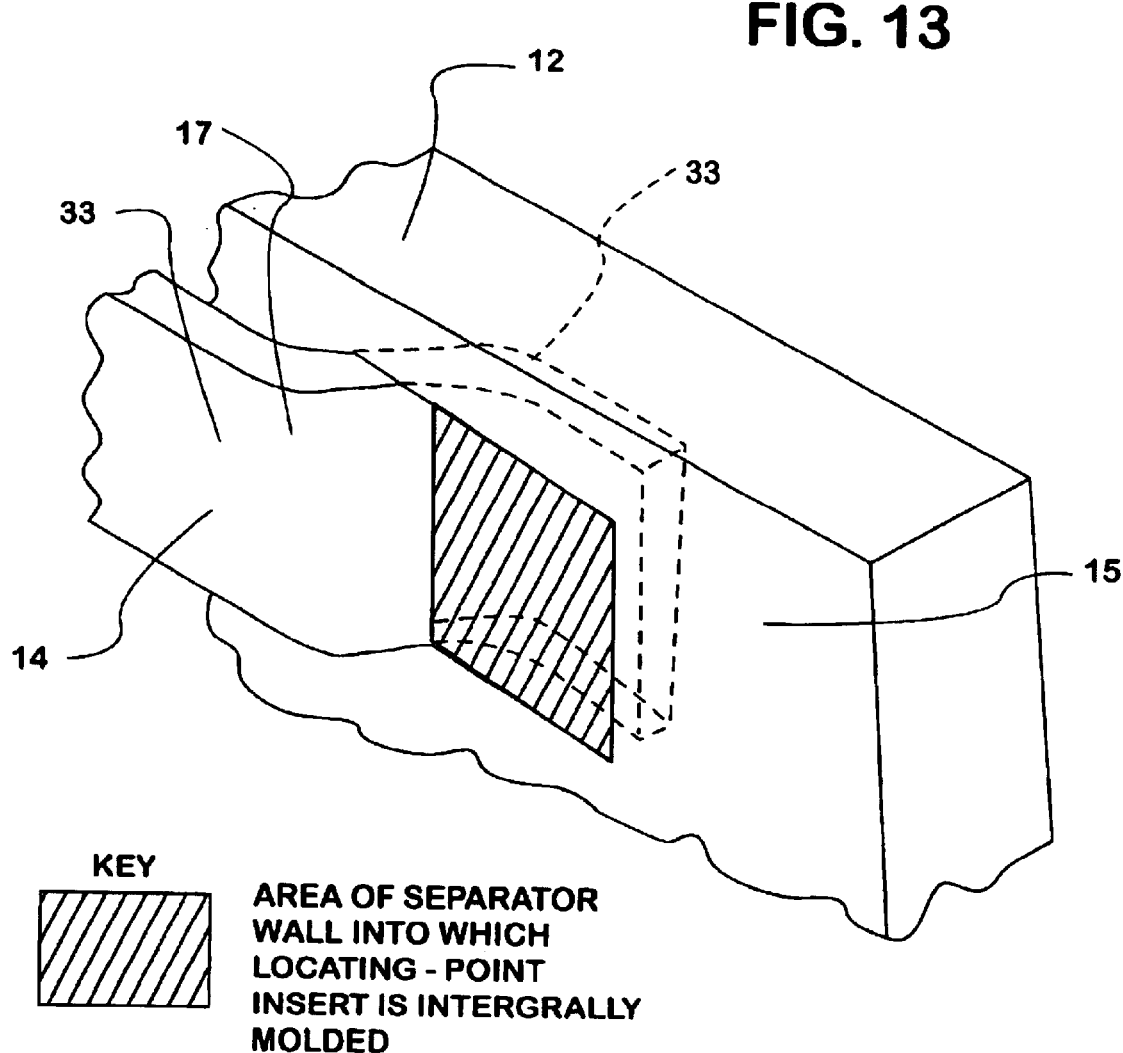
FIG. 13 illustrates the portion of a separator wall into which a locating-point insert that is partially integrally molded or cast into parent material thereof is considered to be integrally molded or cast into.
Figure 14:
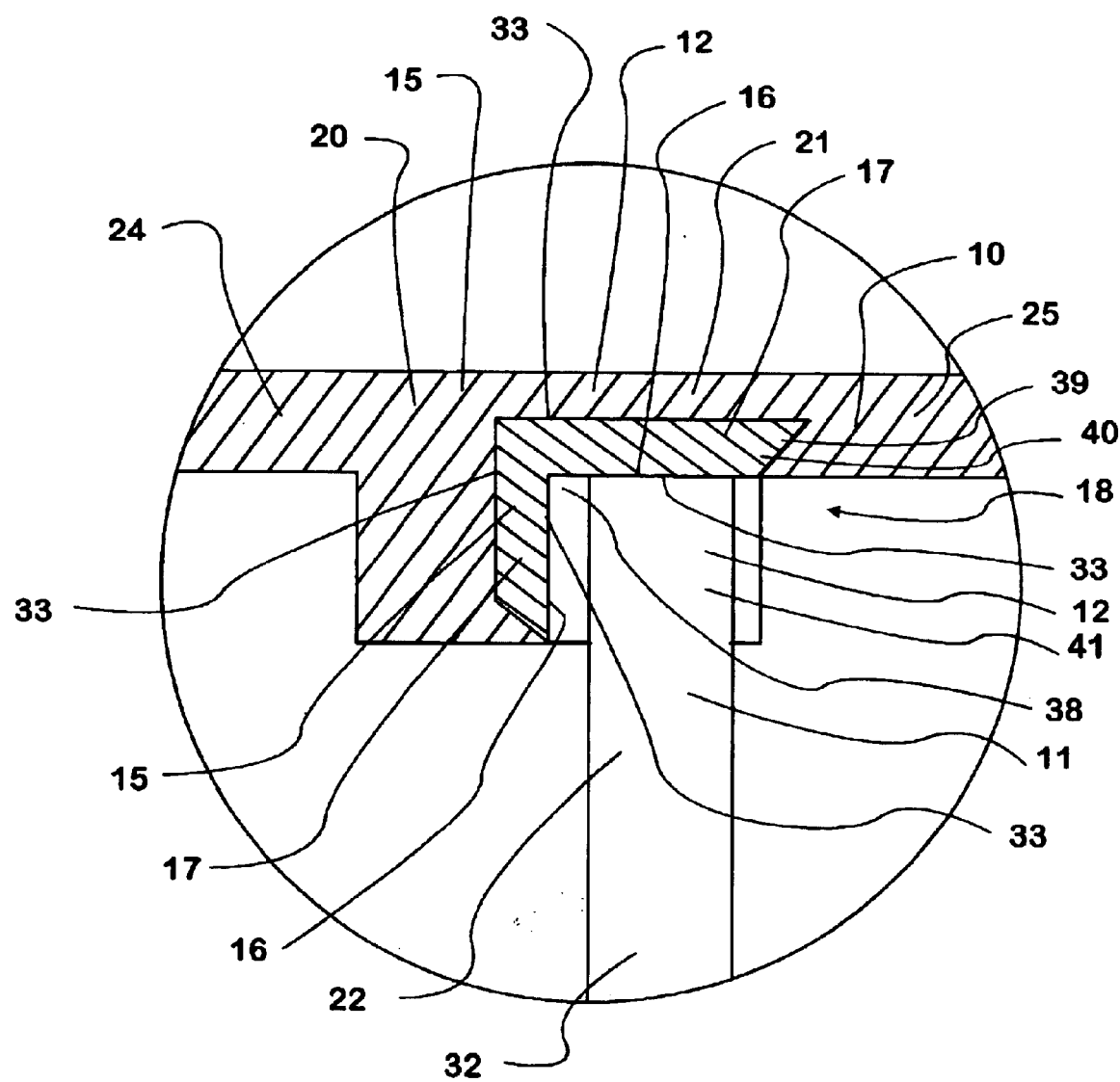
FIG. 14 is a view of the portion of FIG. 1 that is circumscribed by circle XIV that shows in greater detail the complimentary locating-structure pair thereof that comprises a hood-support portion of female construction.

A mounted component 10 according to the present invention that is adapted to form a portion of an enclosure may have one or more locating-point inserts 14 that are engaged to the separator wall 25 of the mounted component 10 in any of a number of ways. In some embodiments of the present invention part of or all of one or more locating-point inserts 14, of one or more of the locating structures 12 of a mounted component 10 that comprises a separator wall 25, may be integrally molded or cast into parent material 15 that is comprised by the separator wall 25. In some embodiments of the present invention in which at least part of a locating-point insert 14 is integrally molded or cast into parent material 15 comprised by the separator wall 25 of a mounted component 10, those locating-point inserts 14 function as a general reinforcement for the separator wall 25 in addition to providing one or more of the functionalities described elsewhere in this disclosure. In such embodiments wherein one or more of the locating-point inserts 14 function as a general reinforcement for a separator wall 25 of a mounted component 10, the portion of the separator wall 25 into which each of those locating-point inserts 14 is integrally molded or cast is generally a considerable portion, such as greater than about 10%, of the separator wall 25. In some embodiments of the present invention in which at least part of a locating-point insert 14 is integrally molded or cast into parent material 15 comprised by the separator wall 25 of a mounted component 10, those locating-point inserts 14 do not function as general reinforcement for the separator wall 25, but do provide one or more of the other functionalities of locating-point inserts 14 described elsewhere in this disclosure. In such embodiments wherein one or more of the locating-point inserts 14, at least a portion of one or more of which is integrally molded or cast into parent material 15 of a separator wall 25 of a mounted component 10, do not function as a general reinforcement for the separator wall 25, the portion of the separator wall 25 into which each of those locating-point inserts 14 is integrally molded or cast is generally a small portion, such as less than about 10%, of the separator wall 25. For purposes of this disclosure the amount of a separator wall 25 into which a given locating-point insert 14 is integrally molded or cast is defined in terms related to the area of the major surfaces 33 of the sheet body that constitutes the separator wall 25. For purposes of this disclosure, the amount of a separator wall 25 into which a portion of a locating-point insert 14 is integrally molded or cast is considered to be proportional to the area of a region of a major surface 33 of the separator wall 25 that is bounded by a curve that would be formed on that major surface 33 by projecting onto that major surface 33 the perimeter of the portion of the locating-point insert 14 that is integrally molded or cast into the separator wall 25 in directions in which the major surface 33 faces. FIG. 13, illustrates in the cross-hatched region such an area, of a major surface 33 of a separator wall 25, that is bounded by a curve formed by such a projection onto the major surface 33 of the perimeter of the portion of a locating-point insert 14 that is integrally molded or cast within the separator wall 25. For purposes of this disclosure the percentage of a separator wall 25 within which a given locating-point insert 14 is integrally molded or cast is determined by comparing the area of such a portion of a major surface 33, that is bounded by such a projection thereunto of an outer perimeter of the locating-point insert 14 as described above, to the total area of the major surface 33.

As was alluded to above, a mounted component 10 that is adapted to be mounted to a mounting component 11 through one or more complimentary locating-structure pairs 18 that comprise locating-point inserts 14 according to the present invention may be a vehicle-body component 24 adapted to form part of a body structure 31 of a vehicle 28. A mounted component 10 that is adapted to be mounted to a mounting component 11 through one or more complimentary locating-structure pairs 18 that comprise locating-point inserts 14 according to the present invention may be any type of vehicle-body component 24 that comprises a separator wall 25 and that is adapted to be or is part of a body structure 31 of a vehicle 28. In some embodiments of the present invention, such as those shown in FIGS. 1, 2, 3, 4, 6, and 7, a mounted component 10 according to the present invention may be a vehicle-body component 24 that is an engine-compartment hood 20. At least one separator wall 25 of an engine-compartment hood 20 is adapted to be disposed above and/or beside an engine of a vehicle 28 and isolate the engine from adverse elements of the weather when the engine-compartment hood 20 is in a closed position. In some embodiments of the present invention, such as those illustrated in FIGS. 1, 2, 3, 4, 6, and 7, an engine-compartment hood 20 is pivotally engaged through one or more complimentary locating-structure pairs 18 to a mounting component 11 such that the engine-compartment hood 20 may be pivoted between its closed position, in which its separator wall 25 is disposed in relatively close proximity above and/or beside the engine of the vehicle 28 in order to cover the engine, and its open position, in which its separator wall 25 is disposed in a more distant position from the engine in order to allow access thereto. In some of these embodiments in which the engine-compartment hood 20 is so pivotally engaged to a mounting component 11, such as those illustrated in FIGS. 1, 2, 3, 4, 6, and 7, the engine-compartment hood 20 comprises locating structures 12 that are hood-support portions 21 of the engine-compartment hood 20 and that are disposed at some distance from the axis about which the engine-compartment hood 20 is pivotally engaged to the mounting component 11. In many embodiments of such engine-compartment hoods 20 the hood-support portions 21 define outer abutment-surfaces 16 that face at least partially downwardly. In many embodiments of the present invention, assemblies that include engine-compartment hoods 20 with such hood-support portions 21 with outer abutment-surfaces 16 that face at least partially downwardly, also include a mounting component 11 that has one or more locating structures 12 that are hood-support structures 22 that define outer abutment-surfaces 16 that face at least partially upwardly and upon which the at least partially downwardly-facing outer abutment-surfaces 16 of the hood-support portions 21 rest when the engine-compartment hood 20 is in its closed position. Additionally, many embodiments of engine-compartment hoods 20 according to the present invention comprise hood-support portions 21 that define outer abutment-surfaces 16 that face at least partially laterally. In many embodiments of the present invention, assemblies that include engine-compartment hoods 20 that have hood-support portions 21 that define outer abutment-surfaces 16 that face at least partially laterally also include hood-support structures 22 that define outer abutment-surfaces 16 that face at least partially laterally and that are positioned such that, when the engine-compartment hood 20 is disposed in its closed position, one or more of the at least partially laterally-facing outer abutment-surfaces 16 of the hood-support portions 21 are disposed adjacent to and facing the at least partially laterally-facing outer abutment-surfaces 16 of one or more of the hood-support structures 22. In many such assemblies in accordance with the present invention, when the engine-compartment hood 20 is disposed in its closed position, the at least partially laterally-facing outer abutment-surfaces 16 of the hood-support portions 21 and those of the hood-support structures 22 limit lateral movement of the engine-compartment hood 20 to a range within outer bounds at which the at least partially laterally-facing outer abutment-surfaces 16 of one or more of the hood-support portions 21 are abutted against one or more of the at least partially laterally-facing outer abutment-surfaces 16 of the hood-support structures 22. Examples of such assemblies in accordance with the present invention in which abutment between at least partially laterally-facing outer abutment-surfaces 16 of hood-support portions 21 and hood-support structures 22 limits lateral movement of an engine-compartment hood 20 when it is in its closed position are illustrated in FIGS. 1, 4, 6, and 7. In some embodiments of the present invention, such as those shown in FIGS. 1, 4, 6, and 7, an assembly that comprises an engine-compartment hood 20 also comprises a mounting component 11 that has one or more hood-support structures 22 that are hood-support prongs 32 constructed and positioned in such a manner that at least partially downwardly-facing outer abutment-surfaces 16 of hood-support portions 21 of the engine-compartment hood 20 rest upon an outer end 41 of said hood-support prong 32 when the engine-compartment hood 20 is in its closed position. Additionally, in some embodiments of the present invention, such as those shown in 1, 4, 6, and 7, at least partially laterally-facing outer abutment-surfaces 16 of hood-support portions 21 of an engine-compartment hood 20 are disposed laterally adjacent an outer end 41 of such a hood-support prong 32 in such a manner to limit lateral movement of the engine-compartment hood 20 when those at least partially laterally-facing outer abutment surfaces 16 of the hood-support portions 21 abut the outer end 41 of the hood-support prong 32. In many embodiments of the present invention one or more of the hood-support portions 21 of an engine-compartment hood 20 comprise locating-point inserts 14 in accordance with the teachings of this disclosure. In many embodiments of the present invention one or more of the outer abutment-surfaces 16 of hood-support portions 21 of an engine-compartment hood 20 are defined by locating-point inserts 14. In many embodiments of the present invention hood-support structures 22 comprise locating-point inserts 14 in accordance with the teachings of this disclosure. In many embodiments of the present invention one or more locating-point inserts 14 comprised by one or more hood-support structures 22 may define one or more outer abutment-surfaces 16 of one or more of those hood-support structures 22. Of course it will also be understood that locating structures 12 of an engine-compartment hood 20 and the mounting component 11 to which it is mounted, other than hood-support portions 21 and hood-support structures 22, may comprise locating-point inserts 14.

An assembly according to the present invention that comprises a mounted component 10 located relative to a mounting component 11 through one or more complimentary locating-structure pairs 18 that comprise locating-point inserts 14 may be virtually any type of assembly. In some embodiments of the present invention a vehicle 28 is an assembly in accordance with the present invention that comprises a mounted component 10 located relative to a mounting component 11 through one or more complimentary locating-structure pairs 18 that comprise one or more locating-point inserts 14. Such a vehicle 28 generally comprises one or more frame structures 29 to which a majority of other components of the vehicle 28 are engaged directly or indirectly and which provide(s) the structure through which proper relative locations of the majority of the other components of the vehicle 28 are maintained. Such a vehicle 28 also generally comprises a suspension system 30 that is engaged to and supports the one or more frame structures 29 of the vehicle 28. Such a suspension system 30 also generally provides the vehicle 28 with a relatively low resistance to movement along the ground. Additionally, a vehicle 28 in accordance with the present invention generally includes one or more body structures 31, within or upon which occupants and/or cargo of the vehicle 28 may reside, that are engaged to and supported by the one or more frame structures 29 of the vehicle 28. In order to be in accordance with the present invention a vehicle 28 must also comprise a mounted component 10 located relative to a mounting component 11 through one or more complimentary locating-structure pairs 18 that comprise one or more locating-point inserts 14. In many embodiments of the present invention the mounting component 11 of such a vehicle 28 is engaged directly or indirectly to and/or is partially comprised by one or more of the one or more frame structures 29 of the vehicle 28.

Those skilled in the art will appreciate that modifications could be made to the invention as described and in some instances some features of the invention will be employed without a corresponding use of other features without departing from the spirit and scope of the invention and thus the scope of the invention is limited only by the following claims.

We claim:

1. An assembly, comprising:
    (a) a mounted component and a mounting component;
    (b) wherein said mounted component and said mounting component comprise one or more complimentary location-structure pairs each of which comprises a first locating structure which said mounted component comprises and a second locating structure which said mounting component comprises which are complimentary to one another and are positioned relative to one another in such a manner to limit relative movement between said mounted component and said mounting component;
    (c) wherein one or more of said locating structures of said complimentary locating-structure pairs comprises a locating point insert that is integrally molded or cast into surrounding parent material of said locating structure that comprises it;
    (d) wherein one or more of said locating-point inserts defines an outer abutment-surface that is part of an outer surface of said locating-structure that comprises it;
    (e) wherein one or more of said complimentary locating-structure pairs that comprises a locating-point insert is so constructed and arranged that relative movement between said locating structures thereof is limited in at least one direction by abutment between said outer abutment-surface of said locating-point insert and said locating structure that is complementary to said locating structure that comprises said locating-point insert;
    (f) wherein each of said locating-point inserts that defines one of said outer-abutment surfaces is constructed of one or more materials at least one of which is harder, more wear-resistant, stiffer, and/or stronger than said parent material that it is integrally molded or cast into;
    (g) wherein one or more of said locating-point inserts comprises one or more sheet-body portions;
    (h) wherein one or more of said locating-point inserts that comprises one or more sheet-body portions is one of said one or more locating-point inserts that defines one of said outer abutment-surfaces of said locating structure within parent material of which it is integrally molded; and
    (i) wherein one or more of said locating-point inserts that comprises one or more sheet-body portions and that defines one or more of said outer abutment-surfaces is constructed and positioned within said parent material within which it is integrally molded or cast in such a manner that a major surface of one of said sheet body portions forms at least part of one of said outer abutment-surfaces defined by said locating-point insert.

2. The assembly of claim 1, wherein:
    (a) one or more of said locating-point insert is constructed entirely of interconnected sheet-body portions.

3. The assembly of claim 1, wherein:
    (a) one or more of said locating-point inserts is constructed of a plastic material;
    (b) said parent material into which one or more of said locating-point inserts that is constructed of plastic material is/are integrally molded or cast is also plastic material; and
    (c) said plastic material, of each locating-point insert that is constructed of plastic material and that is integrally molded or cast into parent material that is plastic material, is harder, has better wear-resistance and/or is stronger than said plastic material into which said locating-point insert is integrally molded or cast.

4. The assembly of claim 1, wherein:
    (a) one or more of said locating-point inserts is constructed of nylon.

5. The assembly of claim 1, wherein:
    (a) said parent material into which one or more of said locating-point inserts is/are integrally molded or cast is SMC.

6. The assembly of claim 1, wherein:
    (a) one or more of said locating-point inserts is/are constructed of nylon and is/are integrally molded or cast in parent material that is SMC.

7. The assembly of claim 2, wherein:
    (a) said locating structures of one or more of said complimentary locating-structure pairs that comprises one of said locating-point inserts are of cooperating male and female constructions.

8. The assembly of claim 7, wherein:
    (a) one or more of said complimentary locating-structure pairs that comprise a locating point insert are constructed and positioned in such a manner that said locating structures thereof are only engaged to one another through abutment of said outer abutment-surface defined by said locating-point insert with said locating structure that is complementary to said locating structure that comprises said locating-point insert.

9. The assembly of claim 8, wherein:
    (a) said mounted component is mounted to said mounting component In such a manner that, as a result of normal usage of said assembly, some relative movement may occur between said mounted component and said mounting component in directions such that one or more of said one or more outer abutment-surfaces defined by one or more of said locating-point inserts may slide against said locating structure that is complimentary to said locating structure that comprises said locating-paint insert that defines said outer abutment-surface.

10. The assembly of claim 9, wherein:

(a) said mounted component comprises a separator wall.

11. The assembly of claim 10, wherein:

(a) said mounted component is a vehicle-body component which comprises a separator wall.

12. The assembly of claim 11, wherein:

(a) said mounted component is an engine-compartment hood that is pivotally engaged through one or more of said complimentary locating-structure pairs to said mounting component;

(b) one or more of said complimentary locating-structure pairs comprises a locating-structure that is a hood-support portion of said engine compartment hood and that is disposed at a distance from an axis about which said engine-compartment hood is pivotally engaged to said mounting component;

(c) one or more of said locating structures that is a hood-support portion comprises one of said locating-point inserts integrally molded or cast into parent material thereof;

(d) one or more of said locating-point inserts that is comprised by one of said hood-support portions defines an outer abutment-surface;

(e) one or more of said complimentary locating-structure pairs that comprises a locating structure that is a hood-support portion further comprises a locating structure that is hood-support structure comprised by said mounting component; and (f) one or more of said outer abutment-surfaces that is defined by one of said locating-point inserts that is comprised by one of said hood-support portions rests upon one of said hood-support structures.

13. The assembly of claim 12, wherein:

(a) one or more of said locating-point inserts that are integrally molded or cast into said hood-support portions of said engine-compartment hood comprise a portion that defines an at least partially downwardly-facing portion of said outer abutment-surface defined by said locating-point insert and said at least partially downwardly-facing portion of said outer abutment-surface rests upon one of said hood-support structures when said engine-compartment hood is in a closed position; and (b) one or more of said locating-point inserts that are integrally molded or cast into said hood-support portions of said engine-compartment hood and that define said at least partially downwardly-facing portion of said outer abutment-surface comprise a portion that defines an at feast partially laterally-facing portion of said outer abutment-surface defined by said locating-point insert and said at least partially laterally-facing portion of said outer abutment-surface is disposed laterally adjacent to said hood-support structure upon which rests said at least partially downwardly-facing portion of said outer abutment-surface of said locating-point insert.

14. The assembly of claim 13, wherein:

(a) one or more of said hood-support structures upon which one of said at least partially downwardly-facing outer abutment-surfaces defined by said locating-point inserts rests is a hood-support prong upon an outer end of which said at least partially downwardly-facing portion of said outer abutment-surface defined by said locating-point insert rests and laterally adjacent said outer end of which said at least partially laterally-facing portion of said outer abutment-surface defined by said locating-point insert is disposed.

15. The assembly of claim 14, wherein:

(a) perimeter portions of one or more of said outer abutment-surfaces defined by one or more of said locating-point inserts are approximately flush with parent material that is disposed adjacent said perimeter portions.

16. The assembly of claim 15, wherein:

(a) one or more of said locating-point inserts comprises one or more anchoring features that strengthen the attachment between said locating-point insert and said parent material into which it is integrally molded or cast.

17. The assembly of claim 16, wherein:

(a) one or more of said anchoring features of one or more of said locating-point inserts is an anchoring channel that is defined between and completely separates two portions of said outer abutment-surface defined by said locating-point insert and said anchoring channel is occupied by a portion of said parent material within which said locating-point insert is integrally molded or cast.

18. The assembly of claim 17, wherein:

(a) one or more of said anchoring features of one or more of said locating-point inserts is a beveled edge that angles into said parent material within which said locating-point insert is integrally molded or cast as it extends away from said outer abutment-surface defined by said locating-point insert.

19. The assembly of claim 18, wherein:

(a) said parent material into which one or more of said locating-point inserts is molded or cast is plastic.

20. The assembly of claim 19, wherein:

(a) one or more of said locating-point inserts are integrally molded or cast into parent material that is SMC.

21. The assembly of claim 20, wherein;

(a) said assembly is a vehicle;

(b) said vehicle comprises one or more frame structures to which a majority of other components of said vehicle are engaged directly or indirectly and from which a majority of other components of said vehicle derive support directly or indirectly;

(c) said vehicle comprises a suspension system to which said one or more frame structures are engaged, from which said one or more frame structures derive support, and which provides said vehicle with a relatively low resistance to movement along the ground;

(d) said vehicle comprises one or more body structures that are directly or indirectly engaged to and derive support directly r indirectly from one or more of said one or more frame structures, and within or upon which cargo and/or occupants of said vehicle may reside; and (e) said mounting component is engaged directly and/or indirectly to and/or is at least partially comprised by one or more of said one or more frame structures of said vehicle.

22. An assembly, comprising;

(a) a mounted component and a mounting component;

(b) wherein said mounted component arid said mounting component comprise one or more complimentary location-structure pairs each of which comprises a first locating structure which said mounted component comprises and a second locating structure which said mounting component comprises which are complimentary to one another and are positioned relative to one another in such a manner to limit relative movement between said mounted component and said mounting component;

(c) wherein one or more of said locating structures of said complimentary locating-structure pairs comprises a locating-point insert that is integrally molded or cast into surrounding parent material of said locating structure that comprises it;

(d) wherein one or more of said locating-point inserts defines an outer abutment-surface that is part of an outer surface of said locating-structure that comprises it;

(e) wherein one or more of said complimentary locating-structure pairs that comprises a locating-point insert is so constructed and arranged that relative movement between said locating structures thereof is limited in at least one direction by abutment between said outer abutment-surface of said locating-point insert and said locating structure that is complementary to said locating structure that comprises said locating-point insert;

(f) wherein each of said locating-point inserts that defines one of said outer-abutment surfaces is constructed of one or more materials at least one of which is harder, more wear-resistant, stiffer, and/or stronger than said parent material that it is integrally molded or cast into;

(g) wherein said mounted component comprises a separator wall;

(h) wherein said mounted component is a vehicle-body component which comprises a separator wall (i) wherein said mounted component is an engine-compartment hood that is pivotally engaged through one or more of said complimentary locating-structure pairs to said mounting component;

(j) wherein one or more of said complimentary locating-structure pairs comprises a locating-structure that is a hood-support portion of said engine compartment hood and that is disposed at a distance from an axis about which said engine-compartment hood is pivotally engaged to said mounting component;

(k) wherein one or more of said locating structures that is a hood-support portion comprises one of said locating-point inserts integrally molded or cast into parent material thereof;

(l) wherein one or more of said locating-point inserts that is comprised by one of said hood-support portions defines an outer abutment-surface;

(m) wherein one or more of said complimentary locating-structure pairs that comprises a locating structure that is a hood-support portion further comprises a locating structure that is hood-support structure; and (n) wherein one or more of said outer abutment-surfaces that is defined by one of said locating-point inserts that is comprised by one of said hood-support portions rests upon one of said hood-support structures.

23. The assembly of claim 22, wherein:

(a) said mounted component is mounted to said mounting component in such a manner that, as a result of normal usage of said assembly, some relative movement may occur between said mounted component and said mounting component in directions such that one or more of said one or more outer abutment-surfaces defined by one or more of said locating-point inserts may slide against said locating structure that is complimentary to said locating structure that comprises said locating-point insert that defines said outer abutment-surface.

24. The assembly of claim 22, wherein:

(a) wherein one or more of said locating-point inserts is constructed of a plastic material;

(b) said parent material into which one or more of said locating-point inserts that is constructed of plastic material is/are integrally molded or cast is also plastic material; and (c) said plastic material, of each locating-point insert that s constructed of plastic material and that is integrally molded or cast into parent material that is plastic material, is harder, has better wear-resistance and/or is stronger than said plastic material into which said locating-point insert is integrally molded or cast.

25. The assembly of claim 23, wherein:

(a) said assembly is a vehicle;

(b) said vehicle comprises one or more frame structures to which a majority of other components of said vehicle are engaged directly or indirectly and from which a majority of other components of said vehicle derive support directly or indirectly;

(c) said vehicle comprises a suspension system to which said one or more frame structures are engaged, from which said one or more frame structures derive support, and which provides said vehicle with a relatively low resistance to movement along the ground;

(d) said vehicle comprises one or more body structures that are directly or indirectly engaged to and derive support directly or indirectly from one or more of said one or more from structures, and within or upon which cargo and/or occupants of said vehicle may reside; and (e) said mounting component is engaged directly and/or indirectly to and/or is at least partially comprised by one or more of said one or more frame structures of said vehicle.

26. An engine-compartment hood for a vehicle that includes one or more hood-support structures, comprising:

(a) a separator wall that is an outer shell of said engine compartment hood;

(b) locating structure that is adapted to be pivotally engaged to the vehicle such that the engine compartment hood is pivotal between an open and a closed position;

(c) one or more locating structures that are hood-support portions of said engine compartment hood;

(d) wherein said hood-support portions of said engine compartment hood are disposed at a distance from said locating structure that is adapted to be pivotally engaged to the vehicle;

(e) wherein said hood-support portions of said engine compartment hood are adapted to rest upon the hood-support structures of the vehicle when said engine compartment hood is mounted thereto and is in said closed position;

(f) wherein one or more of said hood-support portions of said engine-compartment hood comprise locating-point inserts that are Integrally molded or cast into parent material of said hood-support portion and that define an outer abutment-surface;

(g) wherein abutment between said outer abutment surface and one of said hood-support structures limits relative movement between said engine-compartment hood and the vehicle when said engine-compartment hood is mounted to the vehicle and is disposed in its closed position; and (h) wherein each of said locating-point inserts that defines one of said outer abutment-surfaces is constructed of a material that is harder, more wear-resistant, stiffer, and/or stronger than said parent material within which it is integrally molded or cast.

27. The engine-compartment hood of claim 26, wherein:
(a) a portion of one or more of said outer abutment-surfaces defined by one or more of said locating-point inserts that one of said hood-support portions comprises is an at least partially downwardly-facing outer abutment-surface that is constructed and positioned to rest upon one of the hood-support structures when said engine-compartment hood is mounted to the vehicle and is disposed in its closed position.

28. The engine-compartment hood of claim 26, wherein:
(a) one or more of said locating-point inserts are constructed of plastic material.

29. The engine-compartment hood of claim 26, wherein:
(a) one or more of said locating-point inserts comprise one or more sheet-body portions.

30. The engine-compartment hood of claim 26, for a vehicle that has one or more hood-support structures that are of a male construction, wherein:
(a) one or more of said hood-support portions that comprise said locating-point inserts is of a female construction adapted to engage one of the hood-support structures of the vehicle that is of a male construction.

31. The engine-compartment hood of claim 27, for a vehicle that has one or more hood-support structures that are of a male construction, wherein:
(a) one or more of said hood-support portions that comprise said locating-point inserts that define said at least partially downwardly-facing outer abutment-surface is of a female construction adapted to engage one of the hood-support structures of the vehicle that is of a male construction.

32. The engine-compartment hood of claim 29, wherein:
(a) a major surface of one or more of said on or more sheet-body portions of one of said locating-point inserts defines at least a portion of one of said outer abutment-surfaces defined by said locating-point insert.

33. The engine-compartment hood of claim 32, wherein:
(a) one or more of said outer abutment-surfaces that are defined by one of said major surfaces of said sheet-body portions of said locating-point inserts have their perimeter portions substantially flush with parent material that is disposed adjacent said perimeter portions.

34. The engine-compartment hood of claim 31, wherein:
(a) one or more of said hood-support portions that are of a female construction comprises a locating-point insert that defines an at least partially laterally-facing outer-abutment surface and said at least partially laterally-facing outer-abutment-surface that is defined by said locating-point insert is adapted to laterally abut the hood-support structure to which said hood-support portion is adapted to be engaged.

35. The engine-compartment hood of claim 34, wherein:
(a) one or more of said locating-point inserts are constructed of plastic material.

36. The engine-compartment hood of claim 35, wherein:
(a) said parent material into which one or more of said locating-point inserts is integrally molded or cast is SMC.

37. The engine-compartment hood of claim 36, wherein:
(a) one or more of said locating-point inserts comprises one or more anchoring features that increase the strength of attachment of said locating-point insert to said parent material within which said locating-point insert is integrally molded or cast.

38. The engine-compartment hood of claim 37, wherein:
(a) one or more of said locating-point inserts comprise one or more sheet-body portions.

39. The engine-compartment hood of claim 38, wherein:
(a) major surfaces of one or more of said sheet-body portions of said locating-point inserts define at least a portion of one or more of said outer abutment-surfaces defined by said locating-point inserts.

40. An assembly, comprising:
(a) a mounted component that comprises a separator wall;
(b) a mounting component to which said mounted component is mounted;
(c) wherein said mounted component and said mounting component comprise one or more complimentary locating-structure pairs each of which comprises a locating structure that is comprised by said mounted component and that is complimentary to a locating structure that is comprised by said mounting component and that is engaged to said locating structure that is comprised by said mounting component in such a manner to restrain relative movement between said mounting component and said mounted component in one or more directions;
(d) wherein one or more of said locating structures comprised by said mounted component and/or one or more of said locating structures comprised by said mounting component comprises a locating-point insert that is integrally molded or cast into parent material of said locating structure;
(e) wherein one or more of said locating-point inserts is constructed of a material that is harder, mare wear-resistant, stiffer, and/or stronger than said parent material within which said locating-point insert is integrally molded or cast;
(f) wherein no one of said locating-point inserts is integrally molded or cast into said parent material of any more than about b 10% of said separator wall of said mounted component
(g) wherein said mounted component is a vehicle-body component which comprises a separator wall; and
(h) a wherein said mounted component is an engine-compartment hood.

41. The assembly of claim 40, wherein:
(a) said engine-compartment hood is pivotally engaged through one or more of said complimentary locating-structure pairs to said mounting component;
(b) one or more of said complimentary locating-structure pairs comprises a locating-structure that is a hood-support portion of said engine compartment hood and that is disposed at a distance from an axis about which said engine-compartment hood is pivotally engaged to said mounting component;
(c) one or more of said locating structures that is a hood-support portion comprises one of said locating-point inserts integrally molded or cast therein; and
(d) one or more of said complimentary locating-structure pairs that comprises a locating structure that is a hood-support portion that comprises one of said locating-point inserts further comprises a locating structure comprised by said mounting component that is a hood-support structure upon which rests said hood-support portion that comprises said locating-point insert.

42. The assembly of claim 41, wherein:
(a) one or more of said locating-point inserts that are comprised by one or more of said hood-support portions defines an outer abutment-surface; and
(b) abutment between said outer-abutment surface and one of said hood-support structures constrains relative movement between said engine-compartment hood and said mounting component to which said engine-compartment hood is mounted.

43. The assembly of claim 42, wherein:
(a) one or more of said locating-point inserts comprised by one or more of said hood-support portions comprises one or more sheet-body portions.

44. An assembly, comprising:
(a) a mounted component that comprises a separator wall;
(b) a mounting component to which said mounted component is mounted;
(c) wherein said mounted component and said mounting component comprise one or more complimentary locating-structure pairs each of which comprises a locating structure that is comprised by said mounted component and that is complimentary to a locating structure that is comprised by said mounting component and that is engaged to said locating structure that is comprised by said mounting component in such a manner to restrain relative movement between said mounting component and said mounted component in one or more directions;
(d) wherein one or more of said locating structures comprised by said mounted component and/or one or more of said locating structures comprised by said mounting component comprises a locating-point insert that is integrally molded or cast into parent material of said locating structure;
(e) wherein one or more of said locating-point inserts is constructed of a material that is harder, more wear-resistant, stiffer, and/or stronger than said parent material within which said locating-point insert is integrally molded or cast;
(f) wherein no one of said locating-point inserts is integrally molded or cast into said parent material of any more than about 10% of said separator wall of said mounted component;
(g) wherein said mounted component is a vehicle-body component which comprises a separator wall; and
(h) wherein one or more of said locating-point inserts comprises one or more sheet-body portions.

45. The assembly of claim 44, wherein:
(a) one or more of said one or more locating-point inserts that comprises one or more sheet-body portions is oriented in such a manner that portions of major surfaces of said sheet body portions thereof face in directions in which relative movement of said vehicle-body component and said mounting component is constrained by engagement of said locating structure that comprises said locating-point insert to said locating structure that t is complementary to.

46. An assembly, comprising:
(a) a mounted component that comprises separator wall;
(b) a mounting component to which said mounted component is mounted;
(c) wherein said mounted component and said mounting component comprise one or more complimentary locating-structure pairs each of which comprises a locating structure that is comprised by said mounted component and that is complimentary to a locating structure that is comprised by said mounting component and that is engaged to said locating structure that is comprised by said mounting component in such a manner to restrain relative movement between said mounting component and said mounted component in one or more directions;
(d) wherein one or more of said locating structures comprised by said mounted component and/or one or more of said locating structures comprised by said mounting component comprises a locating-point insert that is integrally molded or cast into parent material of said locating structure;
(e) wherein one or more of said locating-point inserts is constructed of a material that is harder, more wear-resistant, stiffer, and/or stronger than said parent material within which said locating-point insert is integrally molded or cast;
(f) wherein no one of said locating-point inserts is integrally molded or cast into said parent material of any more than about 10% of said separator wall of said mounted component;
(g) wherein said mounted component is a vehicle-body component which comprises a separator wall;
(h) wherein said assembly is a vehicle;
(i) wherein said vehicle comprises one or more frame structures to which a majority of other components of said vehicle are engaged directly or indirectly and from which a majority of other components of said vehicle derive support directly or indirectly;
(j) wherein said vehicle comprises a suspension system to which said one or more frame structures are engaged, from which said one or more frame structures derive support, and which provides said vehicle with a relatively low resistance to movement along the ground;
(k) wherein said vehicle comprises one or more body structures that are directly or indirectly engaged to and derive support directly or indirectly from said from structures, and within or upon which cargo and/or occupants of said vehicle may reside; and
(l) wherein said mounting component is engaged directly and/or indirectly to and/or is at least partially comprised by one or more of said one or more frame structures of said vehicle.

47. An assembly, comprising:
(a) a mounted component that comprises a separator wall;
(b) a mounting component to which said mounted component is mounted;
(c) wherein said mounted component and said mounting component comprise one or more complimentary locating-structure pairs each of which comprises a locating structure that is comprised by said mounted component and that is complimentary to a locating structure that is comprised by said mounting component and that is engaged to said locating structure that is comprised by said mounting component in such a manner to restrain relative movement between said mounting component and said mounted component in one or more directions;

(d) wherein one or more of said locating structures comprised by said mounted component comprises a locating-point insert that is integrally molded or cast into parent material of said locating structure;

(e) wherein said parent material of said locating structure into which one or more of said locating point inserts is integrally molded is part of said separator wall;

(f) wherein one or more of said locating point inserts that is integrally molded into parent material of said separator wall is constructed of a material that is harder, more wear-resistant, stiffer, and/or stronger than said parent material of said separator wall; and (g) wherein said mounted component is a vehicle-body component.

48. The assembly of claim 47, wherein:

(a) wherein no one of said locating-point inserts that is integrally molded or cast into said separator wall is integrally molded or cast into parent material of any more than about 10% of said separator wall.

49. The assembly of claim 47, wherein:

(a) one or more of said locating-point inserts defines at least a portion of an outer-abutment surface of said locating-structure that comprises said locating-point insert; and (b) said portion of said outer abutment surface that is defined by said locating-point insert is in abutment with said locating structure that is complimentary to said locating structure that comprises said locating-point insert that defines said portion of said outer abutment-surface.

50. The assembly of claim 48, wherein:

(a) one or more of said locating-point inserts defines at least a portion of an outer-abutment surface of said locating-structure that comprises said locating-point insert; and (b) said portion of said outer abutment surface that is defined by said locating-point insert is in abutment with said locating structure that is complimentary to said locating structure that comprises said locating-point insert that defines said portion of said outer abutment-surface.

51. The assembly of claim 49, wherein:

(a) said mounting component and said mounted component are constructed and engaged to one another in such a manner that said mounting component and said mounted component may move relative to one another in such a manner that said portion of said outer abutment-surface that is defined by said locating-point insert may slide against said locating structure with which it is in abutment.

52. The assembly of claim 50, wherein:

(a) said mounting component and said mounted component are constructed and engaged to one another in such a manner that said mounting component and said mounted component may move relative to one another in such a manner that said portion of said outer abutment-surface that is defined by said locating-point insert may slide against said locating structure with which it is in abutment.

* * * * *